(12) United States Patent
Blodow et al.

(10) Patent No.: US 12,182,930 B2
(45) Date of Patent: *Dec. 31, 2024

(54) ENCLOSED MULTI-VIEW VISUAL MEDIA REPRESENTATION

(71) Applicant: Fyusion, Inc., San Francisco, CA (US)

(72) Inventors: Nico Gregor Sebastian Blodow, Hettenshausen (DE); Martin Saelzle, San Francisco, CA (US); Matteo Munaro, San Francisco, CA (US); Krunal Ketan Chande, San Francisco, CA (US); Rodrigo Ortiz Cayon, San Francisco, CA (US); Stefan Johannes Josef Holzer, San Mateo, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,741

(22) Filed: Feb. 23, 2023

(65) Prior Publication Data
US 2023/0196658 A1     Jun. 22, 2023

Related U.S. Application Data

(63) Continuation of application No. 17/342,258, filed on Jun. 8, 2021, now Pat. No. 11,615,582.

(51) Int. Cl.
*G06T 15/20* (2011.01)
*G06T 19/00* (2011.01)
*H04N 13/282* (2018.01)

(52) U.S. Cl.
CPC .......... *G06T 15/20* (2013.01); *G06T 19/003* (2013.01); *H04N 13/282* (2018.05)

(58) Field of Classification Search
CPC ..... G06T 15/20; G06T 19/003; G06T 19/006; G06T 2210/56; G06T 17/00;
(Continued)

(56) References Cited

U.S. PATENT DOCUMENTS

| | | |
|---|---|---|
| 6,434,278 B1 | 8/2002 | Hashimoto |
| 7,194,112 B2 * | 3/2007 | Chen ......................... G06T 7/30 348/42 |

(Continued)

OTHER PUBLICATIONS

Domański et al., A Practical Approach to Acquisition and Processing of Free Viewpoint Video, 2015 (Year: 2015).*
(Continued)

*Primary Examiner* — Phong X Nguyen
(74) *Attorney, Agent, or Firm* — Kwan & Olynick LLP

(57) ABSTRACT

Images may be captured at an image capture device mounted on an image capture device gimbal capable of rotating the image capture device around a nodal point in one or more dimensions. Each of the plurality of images may be captured from a respective rotational position. The images may be captured by a designated camera that is not located at the nodal point in one or more of the respective rotational positions. A designated three-dimensional point cloud may be determined based on the plurality of images. The designated three-dimensional point cloud may include a plurality of points each having a respective position in a virtual three-dimensional space.

20 Claims, 17 Drawing Sheets

(58) Field of Classification Search
CPC .. H04N 13/282; H04N 13/111; H04N 13/243; H04N 13/271
See application file for complete search history.

(56) References Cited

U.S. PATENT DOCUMENTS

| | | | |
|---|---|---|---|
| 7,465,107 | B2 | 12/2008 | Washisu |
| 8,879,828 | B2 | 11/2014 | Bell |
| 10,901,305 | B2 | 1/2021 | Liu |
| 11,147,647 | B2* | 10/2021 | Kado .................... G02B 21/22 |
| 11,295,525 | B1 | 4/2022 | Kelly |
| 11,615,582 | B2* | 3/2023 | Blodow ............... H04N 13/271 345/419 |
| 11,922,562 | B2* | 3/2024 | Wetzstein ............. G06N 3/048 |
| 2010/0210377 | A1* | 8/2010 | Lock .................. A63B 69/3658 473/409 |
| 2011/0032374 | A1* | 2/2011 | Imanishi .................... G06T 5/50 348/222.1 |
| 2012/0050322 | A1 | 3/2012 | Sato |
| 2014/0043436 | A1 | 2/2014 | Bell |
| 2015/0086188 | A1 | 3/2015 | Johnson, Sr. |
| 2017/0059306 | A1* | 3/2017 | Lasater .................. H04N 7/183 |
| 2017/0315428 | A1 | 11/2017 | Johnson, Sr. |
| 2017/0331986 | A1* | 11/2017 | Houba ................. H04N 23/698 |
| 2018/0067493 | A1 | 3/2018 | Pilskalns |
| 2018/0144547 | A1* | 5/2018 | Shakib .................. G06T 15/503 |
| 2019/0110038 | A1 | 4/2019 | Diverdi |
| 2019/0182424 | A1 | 6/2019 | Omari |
| 2019/0228505 | A1 | 7/2019 | Douady-Pleven |
| 2020/0112684 | A1 | 4/2020 | Ingram |
| 2020/0252549 | A1 | 8/2020 | Jamjoom |
| 2020/0294194 | A1* | 9/2020 | Sun ...................... H04N 23/698 |
| 2020/0410750 | A1 | 12/2020 | Huang |
| 2021/0176395 | A1 | 6/2021 | Lu |
| 2021/0264658 | A1* | 8/2021 | Varekamp ................. G06T 7/74 |
| 2021/0286339 | A1* | 9/2021 | Link ......................... G06T 7/33 |
| 2022/0051469 | A1 | 2/2022 | Yoneda |
| 2022/0075504 | A1 | 3/2022 | Little |
| 2022/0114782 | A1 | 4/2022 | Bruls |
| 2022/0148252 | A1 | 5/2022 | Puett |
| 2023/0196658 | A1* | 6/2023 | Blodow ................. G06T 17/00 345/419 |
| 2023/0360290 | A1* | 11/2023 | Keller ...................... G06T 3/40 |

OTHER PUBLICATIONS

Pathak et al., Virtual Reality with Motion Parallax by Dense Optical Flow-based Depth Generation from Two Spherical Images, 2017 (Year: 2017).*

Ceulemans et al., Robust Multiview Synthesis for Wide-Baseline Camera Arrays, 2018 (Year: 2018).*

DigitalRev TV, DJI OSMO Mobile 2 Hands-on Review + Cinematic gimbal tricks!, uploaded on Apr. 19, 2018, available at https://www.youtube.com/watch?v=ZaJ_Tz_gDso (Year: 2018).

Gael Guennebaud et al., "Efficient Screen Space Approachfor HW Accelerated Surfel Rendering," VMV03, Nov. 2003, http://www.irit.fr/recherches/SIRV/VIS/Surfel/index.html, 22 pages.

Gaquin et al., Smart phone orientatiNPL671on estimation comparisons using three axis gimbal, 2016 (Year: 2016).

Oniga et al., Accuracy Assessment of a Complex Building 3D Model Reconstructed From Images Acquired With a Low-Cost UAS, 2017 (Year: 2017).

* cited by examiner

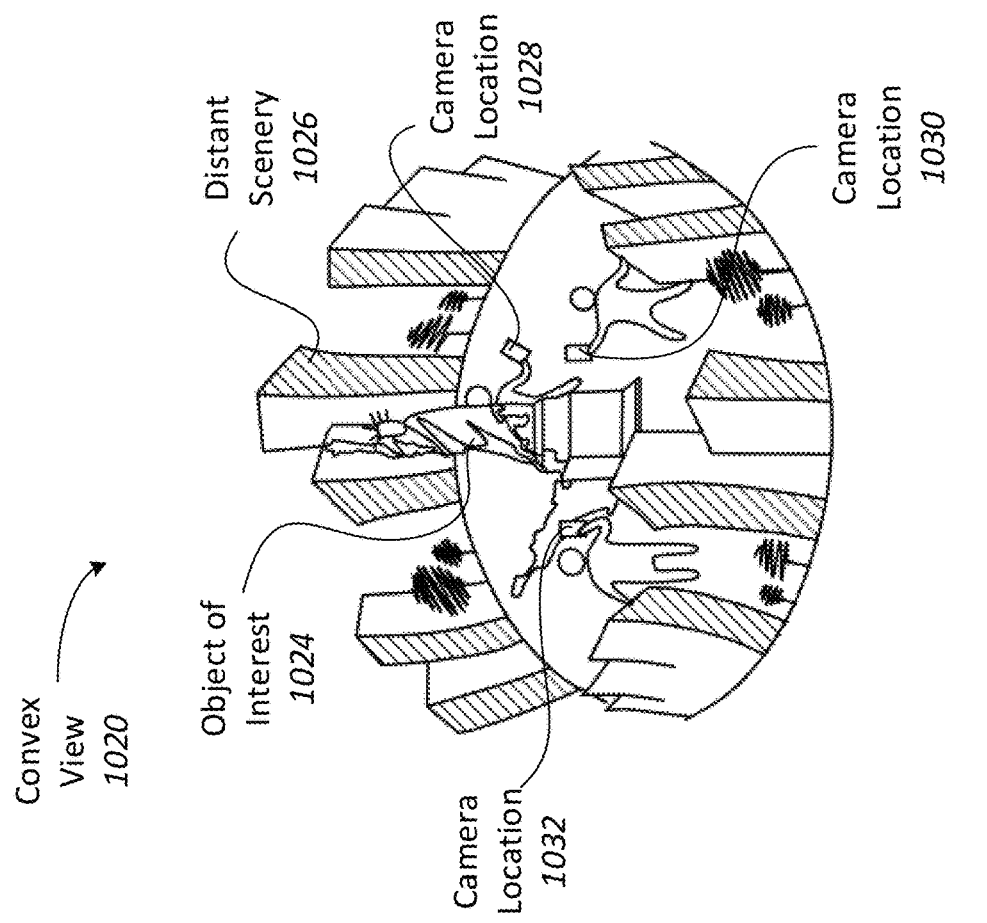
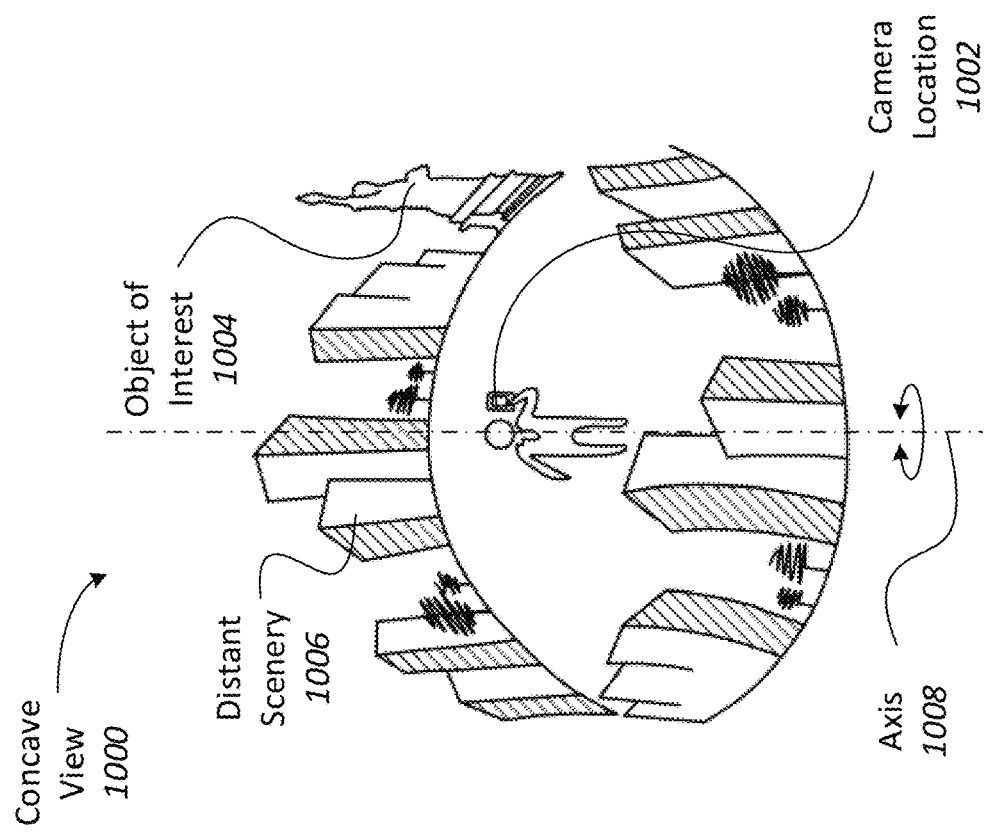
Figure 10B
Figure 10A

ENCLOSED MULTI-VIEW VISUAL MEDIA REPRESENTATION

CROSS-REFERENCE TO RELATED APPLICATIONS

The present application claims priority under 35 U.S.C. 120 to U.S. patent application Ser. No. 17/342,258, titled "ENCLOSED MULTI-VIEW VISUAL MEDIA REPRESENTATION," filed Jun. 8, 2021, by Blodow et al., which is hereby incorporated by reference in its entirety and for all purposes.

TECHNICAL FIELD

The present disclosure relates generally to the collection and processing of image data, and more specifically to the collection and processing of image data within enclosed spaces.

DESCRIPTION OF RELATED ART

The capture of images within enclosed spaces, such as vehicle interiors, presents a variety of technical challenges. Single images usually capture less than one hemisphere of the capture space. For full sphere coverage of a space, multiple images need to be captured, and data combined through image processing techniques.

Conventional techniques for capturing and combining images of enclosed spaces are limited. Some fixed setups involve capturing a small number of images and combining them, but these techniques typically lead to low resolution output and optical issues such as distortions, fringing, and chromatic aberration. Digital single-lens reflex camera, pan-tilt-unit, and nodal point bracket based techniques can capture many images and combine them, but typically involve high hardware and setup costs as well as other drawbacks. For example, focus is generally set once for the whole capture, so manual intervention and photographic expertise is often needed, for instance to balance between proper aperture settings with exposure time and to address exposure challenges such as the capture of images with and against the direction of light. Accordingly, improved techniques are desired.

OVERVIEW

According to various embodiments, techniques and mechanisms described herein provide for systems, devices, methods, and machine readable media for the collection and processing of image data.

According to various embodiments, a plurality of images captured at an image capture device mounted on an image capture device gimbal may be identified. The image capture device gimbal may be capable of rotating the image capture device around a nodal point in one or more dimensions. Each of the plurality of images may be captured from a respective rotational position. The plurality of images may be captured by a designated camera that is not located at the nodal point in one or more of the respective rotational positions. A designated three-dimensional point cloud may be determined based on the plurality of images. The designated three-dimensional point cloud may include a plurality of points each having a respective position in a virtual three-dimensional space. One or more synthetic images may be generated based at least in part on the three-dimensional point cloud. Each of the synthetic images may be generated from a respective virtual viewpoint within the virtual three-dimensional space and stored on a storage device.

According to various embodiments, determining the designated three-dimensional point cloud involves determining a plurality of three-dimensional point clouds corresponding with respective ones of the plurality of images. The designated camera may be located at a designated position relative to the nodal point, and the designated position may have a translation component.

According to various embodiments, the three-dimensional point cloud may be determined at least in part by numerically estimating a value for the translational component based on the plurality of three-dimensional point clouds and the respective rotational positions. The designated position may have a rotational component, and the three-dimensional point cloud may be determined at least in part by numerically estimating a value for the rotational component based on the plurality of three-dimensional point clouds and the respective rotational positions. Each of the respective virtual viewpoints may be located at the nodal point.

According to various embodiments, one or more of the plurality of images may be associated with respective depth sensor data captured from a depth sensor located at the image capture device, and the designated three-dimensional point cloud may be determined at least in part based on the respective depth sensor data.

According to various embodiments, the image capture device may be configured to capture inertial data via an inertial measurement unit located at the image capture device. one or more of the respective rotational positions may be identified based at least in part on the inertial data.

According to various embodiments, a multi-view interactive digital media representation may be generated based on the synthetic images. The multi-view interactive digital media representation may be navigable in one or more dimensions. Navigating the multi-view interactive digital media representation may involve presenting a first one of the synthetic images on a display screen, receiving user input indicating an adjustment to a rotational perspective, and presenting a second one of the synthetic images on the display screen and selected to reflect the adjustment to the rotational perspective.

According to various embodiments, identifying the plurality of images may involve transmitting one or more messages between the image capture device and the image capture device gimbal. A first one of the messages may be transmitted from the image capture device and the image capture device gimbal. The first message may indicate a first one of the respective rotational positions. A second one of the messages may be transmitted from the image capture device gimbal to the image capture device. The second message may include position data generated by the image capture device gimbal.

BRIEF DESCRIPTION OF THE DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

FIGS. 10A-10B illustrate examples of concave and convex views, where both views use a back-camera capture style.

DETAILED DESCRIPTION

Techniques and mechanisms described herein provide for the creation of a multi-view digital media representation (MVDMR) of an enclosed space. A camera device such as a mobile phone may be mounted on a gimbal device, which may be instructed to position the camera device to capture images from various orientations. Various types of information, such as inertial measurement unit data, positioning information received from the gimbal device, depth sensor information, and visual data may be combined to create a three-dimensional model of the enclosed space. From that three-dimensional model, one or more images may be generated.

Various techniques exist for constructing a panorama of an enclosed space. However, conventional techniques all suffer from various drawbacks. One type of conventional technique involves capturing a small number of images from fixed locations. However, in such a configuration, each image includes less than half of a 360-degree view of the enclosed space, and insufficient image data leads to a low-quality, low-resolution panorama.

Another conventional technique for enclosed space image capture is a gimbal-mounted mobile phone. However, such configurations place the camera lens outside of the gimbal's center of rotation (i.e., its nodal point), which leads to parallax errors since different images are captured not only from different orientations, but also from different positions in 3D space.

Yet another conventional technique for enclosed space image capture is a panohead, which allows a camera device to be mounted such that the camera lens is located near the center of the gimbal's three-dimensional rotation. Such an approach may eliminate parallax. However, panoheads are expensive, large, and difficult to configure. In particular, they must be separately configured for each device, and thus are poorly suited to a use case in which inexperienced users seek to capture image data of enclosed spaces via a mobile phone.

According to various embodiments, techniques and mechanisms described herein provide for the creation of high-quality individual images, panorama views, or MVDMRs that overcome the parallax problem while using mobile phones or other camera devices mounted on gimbals, without the need for a panohead.

According to various embodiments, techniques and mechanisms are described herein as relating to the capture of image data within an enclosed space. Examples of enclosed spaces may include, but are not limited to: vehicle interiors, building or room interiors, container interiors, and cave interiors. However, it should be noted that the techniques and mechanisms described herein are generally applicable to a variety of situations and are not limited to situations involving enclosure. Instead, techniques and mechanisms described herein may be employed in a variety of enclosed, unenclosed, and partially enclosed contexts.

Figure 1:
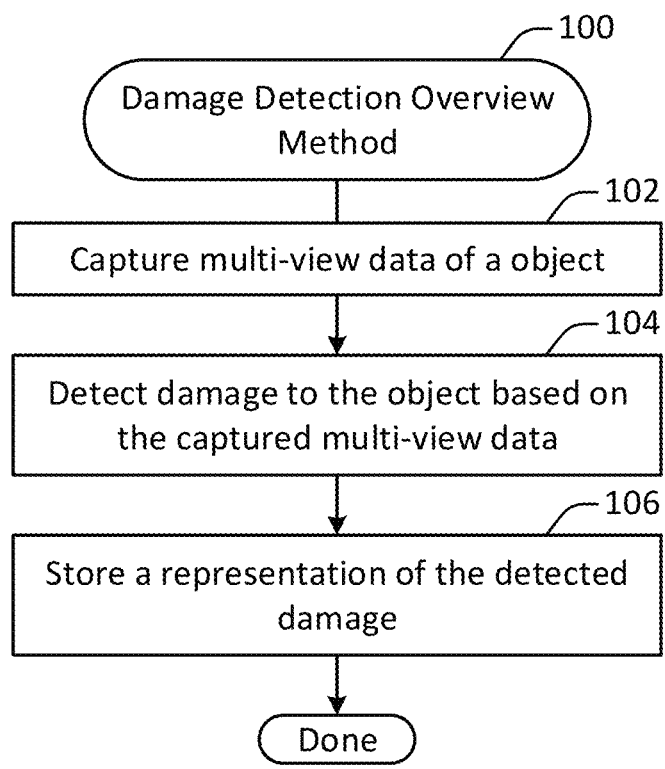
FIG. 1 illustrates an overview method for enclosed space visualization, performed in accordance with one or more embodiments.

FIG. 1 illustrates an overview method 100 for enclosed space visualization, performed in accordance with one or more embodiments. According to various embodiments, the method 100 may be performed on a mobile computing device such as a mobile phone. In some configurations, a portion of the method 100 may be performed at a remote computing device such as a server or laptop computer.

One or more images are captured at 102. According to various embodiments, the capture of one or more images may be performed by a mobile phone or other camera device mounted on a gimbal device. The gimbal device may be remotely controlled by the camera device or by a different computing device. Each of the images may be captured from a respective orientation of the gimbal device.

In some implementations, additional information may be captured in addition to the image data. For example, the additional information may include depth sensor information such as infrared and/or LIDAR data. As another example, the additional information may include inertial data such as gyroscopic data captured by an inertial measurement unit. Additional details regarding the capture of image data are discussed with respect to the method 400 shown in FIG. 4.

An image three-dimensional model is determined at 104. According to various embodiments, the image three-dimensional model may represent the enclosed space that is determined based on the information captured at 102. The three-dimensional model may include, for instance, a set of points in three-dimensional space that are determined by combining information from potentially multiple images and/or other captured data.

In particular embodiments, the capture of a two-dimensional image along with corresponding depth information may allow for the construction of a three-dimensional point cloud in which particular points in the cloud are connected. In some configurations, an organized point cloud may be used. In an organized point cloud, a specific number of points may be stored. For instance, each pixel in the source image may correspond with a point in the organized point cloud, although some pixels may store invalid values, for instance if no information is available for the pixel. In such a configuration, the combination of pixel values, depth values, and connectivity information may cause the organized point cloud to function as a depth image projected onto three dimensions.

According to various embodiments, different representations may be used for the image-level and scene-level analysis. For example, an organized point cloud may be generated for each image. Then, a unified 3D representation (also referred to as a 3D model) may be generated by combining the individual organized point clouds.

One or more synthetic images are generated at 106. According to various embodiments, each synthetic image may be generated from a virtual camera position based on the three-dimensional model. For instance, the virtual camera position may be near the nodal point of the gimbal. The virtual camera position may be determined at least in part by determining a translation value between the actual, unknown position of the camera lens relative to the nodal point based on the information captured at 102 and determined at 104. Additional details regarding the determination of an image three-dimensional model and the generation of one or more synthetic images are discussed with respect to the method 500 shown in FIG. 5.

According to various embodiments, any of various techniques may be used to generate the one or more synthetic images. For example, point cloud rendering may be used. As another example, surfel rendering may be used. In surfel rendering, each point may be represented as a disk or other shape, for instance with an associated normal vector. As yet another example, the rendering may employ connectivity information between points. Such connectivity information may be determined at least in part based on information received from depth sensors.

Figure 2:
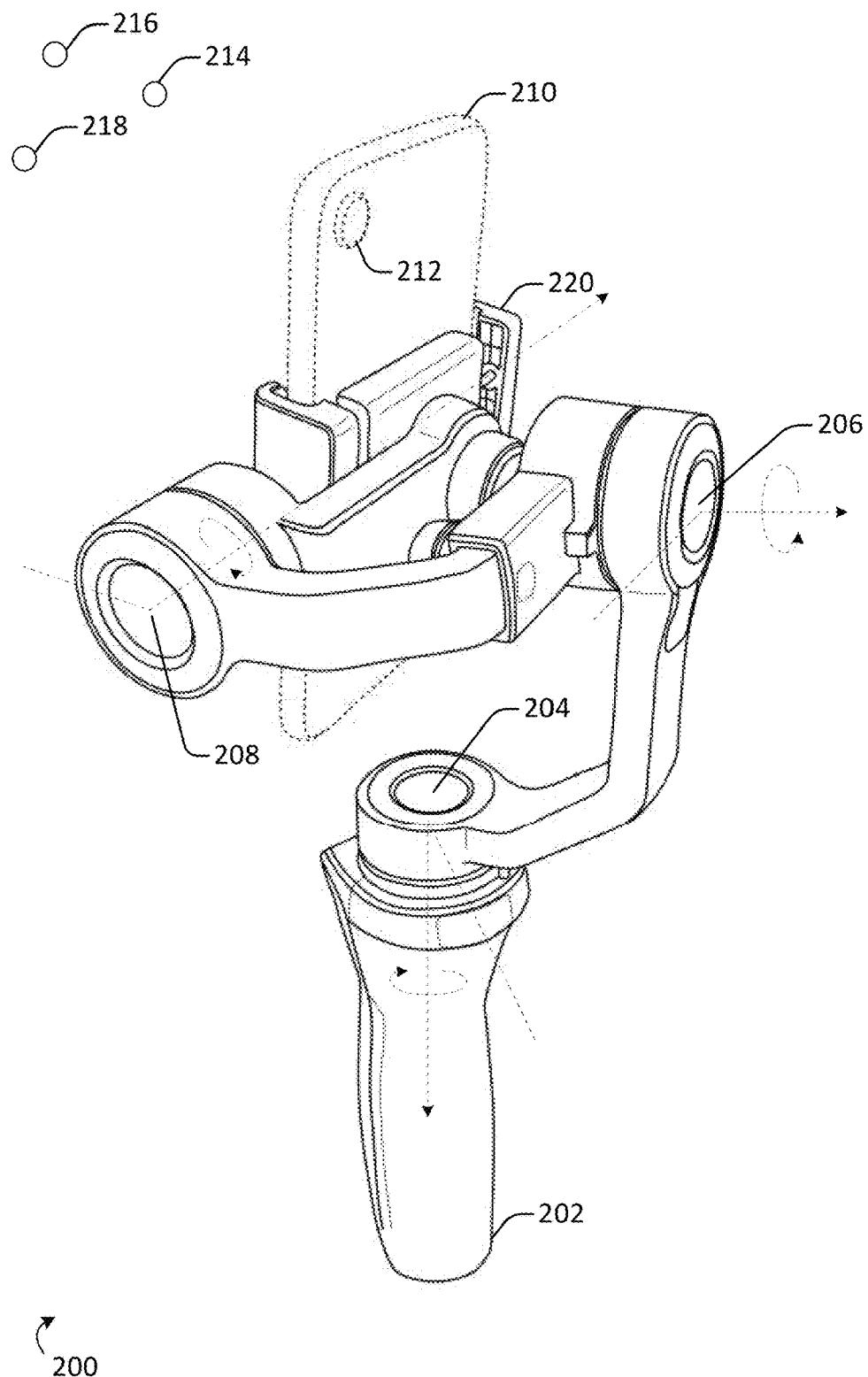
FIG. 2 and FIG. 3 illustrate examples of an image capture gimbal device system, configured in accordance with one or more embodiments.
Figure 3:
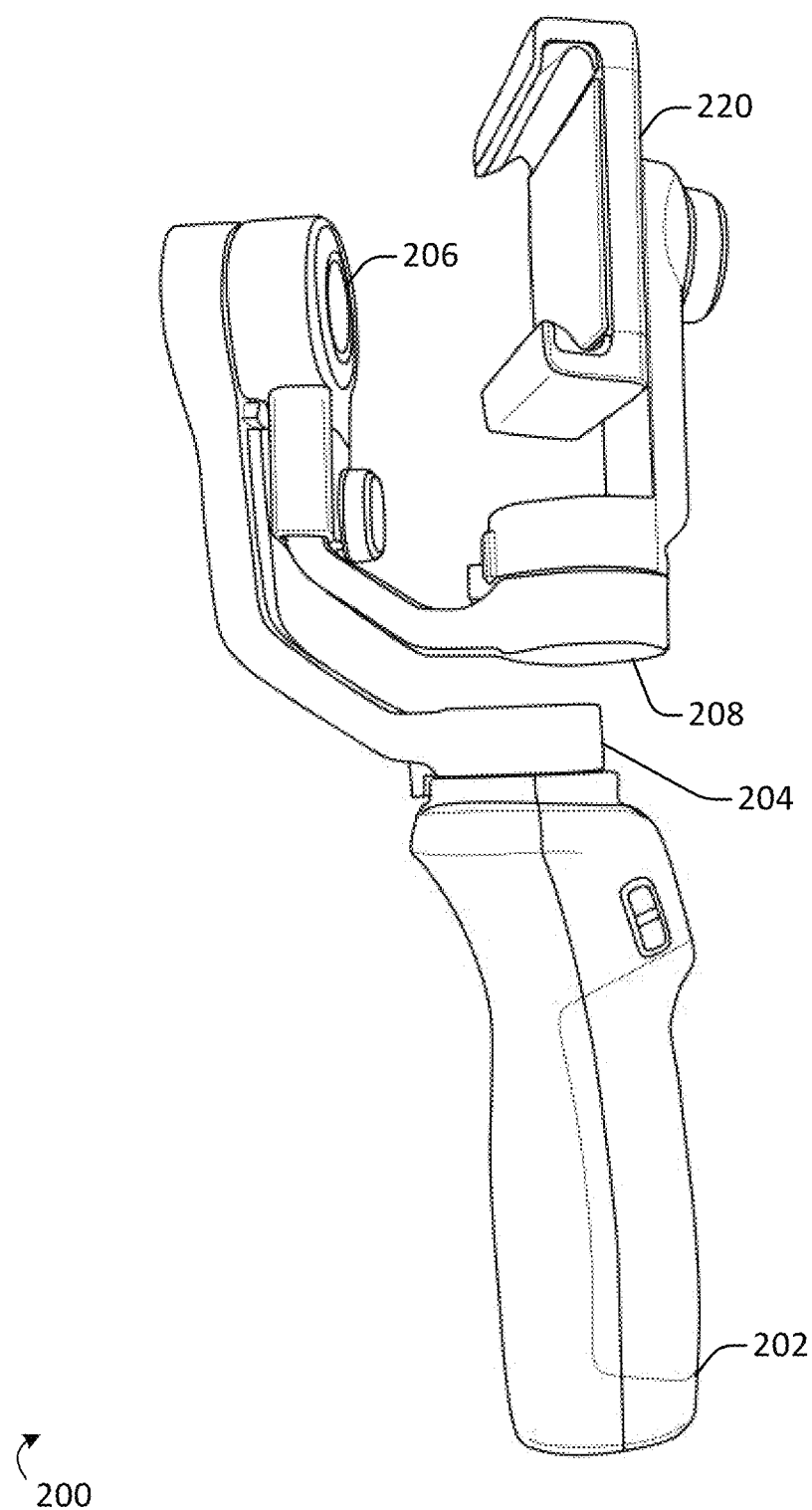

FIG. 2 and FIG. 3 illustrate examples of an image capture gimbal device system 200, configured in accordance with one or more embodiments. The image capture gimbal device system 200 includes an image capture gimbal device 202, a removable image capture device 210, and point cloud points 214, 216, and 218.

According to various embodiments, the image capture gimbal device 202 includes a camera device mounting apparatus 220 and one or more axes of rotation along which the camera device may be rotated. For example, the image capture gimbal device 202 includes the axes of rotation 204, 206, and 208.

According to various embodiments, any suitable camera device mounting apparatus 220 may be employed. For instance, the camera device mounting apparatus 220 may include one or more gripping jaws, adhesive areas, or other such connection mechanisms.

In some implementations, an axis of rotation may be automatically operated by an internal motor. For instance, each of the axes of rotation 204, 206, and 208 may be operated independently based on motors internal to the image capture gimbal device 202. The motors may be actuated based on an instruction received from a computing device. For instance, the removable image capture device 210 may send an instruction to operate the motors.

In particular embodiments, one or more of the axes of rotation may be misaligned with one another. For instance, the rotational axis for pitch may be offset from the rotational axis for yaw by a particular amount. As discussed with respect to the method 500 shown in FIG. 5, that amount may be determined and then factored in to one or more transformations.

In some embodiments, the instruction from the remote computing device may be transmitted by any suitable communication protocol. For example, the removable image capture device 210 may communicate with the image capture gimbal device 202 via Bluetooth, WIFI, or another communication protocol.

In some embodiments, the instruction from the remote computing device may indicate a desired orientation at which the removable image capture device 210 is to be positioned. The orientation may be specified in one, two, or three dimensions.

According to various embodiments, the image capture device 210 may be a mobile phone. Alternatively a different type of image capture device, such as an SLR or mirrorless camera, may be employed. The image capture device 210 includes an imaging lens 212 and associated optical and digital components for capturing images.

According to various embodiments, the image capture device 210 may include various numbers and types of sensors. Examples of such sensors may include, but are not limited to: image capture sensors, depth sensors, and inertial measurement unit components. One or more of various types of image capture sensors may be employed, such as one or more conventional lens cameras, fisheye lens cameras, wide angle lens cameras, or light sensors. One or more of various types of depth sensors may be employed, such as one or more LIDAR sensors, infrared sensors, and projected light sensors. One or more inertial measurement unit components may be employed, such as one or more accelerometers, gyroscopic sensors, or other such sensors.

In some implementations, the image capture device 210 may be configured to coordinate with the image capture gimbal device 202 to capture various data. For instance, the image capture device 210 may be configure to instruct the image capture gimbal device 202 to position the image capture device 210 at a particular orientation. The image capture device 210 may capture sensor data that is then associated with the particular orientation at which the data is captured.

In some embodiments, the collected data may be used to construct a three-dimensional model. The three-dimensional model may include a set of points and/or edges connecting points in a virtual three-dimensional space. The virtual three-dimensional space may provide a model of the actual three-dimensional space in which the image capture device is positioned. Examples of such points are shown at 214, 216, and 218. The point cloud points may represent points on physical surfaces that appear in images and/or depth sensor data captured by the image capture device 210.

Figure 4:
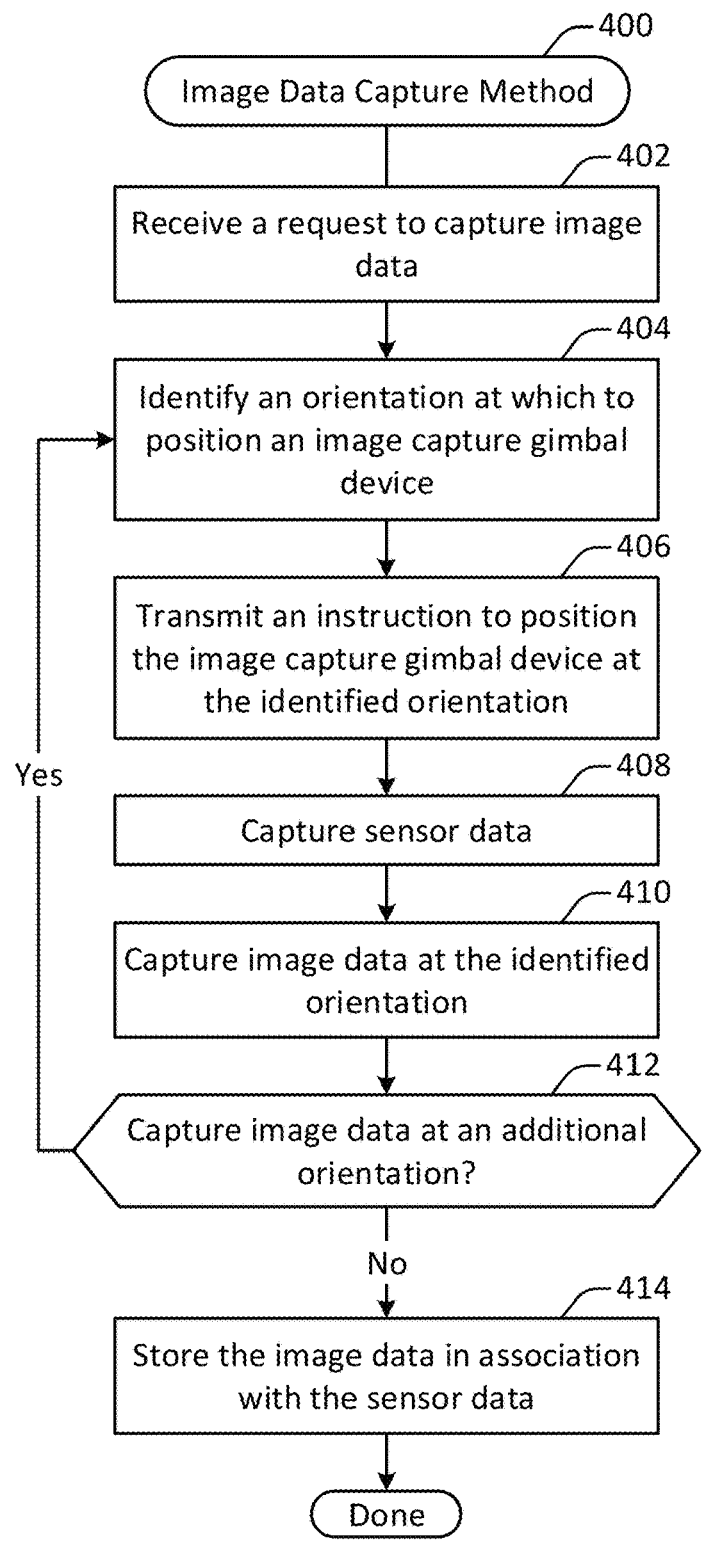
FIG. 4 illustrates one example of a method for capturing image data, performed in accordance with one or more embodiments.

FIG. 4 illustrates one example of a method 400 for capturing image data, performed in accordance with one or more embodiments. According to various embodiments, the method 400 may be performed on a computing device. The computing device may be an image capture device such as the device 210 mounted on an image capture gimbal device such as the device 202 shown in FIGS. 2 and 3.

A request to capture image data is received at 402. In some implementations, the request may be generated automatically, such as when the system detects that the image capture gimbal device is positioned at a designated location.

Alternatively, the request may be generated manually. For instance, a user may position the image capture gimbal device and then provide an instruction to begin capturing image data.

An orientation at which to position the image capture gimbal device is identified at 404. In some implementations, the capture of image data may be associated with a particular set of orientations. For instance, the orientations may be arranged in a rotational grid so that the image capture device is positioned at each of a set of orientations spaced roughly equally apart from one another.

In some embodiments, the orientations may be determined dynamically. For instance, areas of higher detail or that include complex occlusions within the three-dimensional environment may be subject to additional image data capture at more positions than areas of lower detail or that do not include complex occlusions.

An instruction to position the image capture gimbal device at the identified orientation is transmitted at 406. In some implementations, the instruction may be sent from the image capture device to the image capture gimbal device via any suitable communication protocol. For instance, a wired communication protocol such as USB may be employed. Alternatively, or additionally, a wireless communication protocol such as Bluetooth or WIFI may be employed.

Sensor data is captured at 408. According to various embodiments, the sensor data captured may include accelerometer, gyroscopic, or other motion data captured from an inertial measurement unit (IMU). Alternatively, or additionally, the sensor data may include depth sensor information such as data from a projected light field, infrared, time-of-flight, LIDAR, or other such sensor.

Image data is captured at 410. The image data may captured in the form of an image taken by a camera on the image capture device. The image data may be associated with a specific orientation. For instance, the orientation included in the instruction transmitted to the image capture gimbal device at 406 may be associated with the image data.

In particular embodiments, more than one image may be captured. For examples, a mobile phone may include two cameras having different optical properties and facing in the same direction. As another example, a mobile phone may include both front and rear cameras.

In some implementations, the sensor data and/or image data may be captured continuously or at various points in time. For example, capturing IMU data and/or depth sensor data during the period in which the image capture gimbal device is transitioning between one position and another position may allow the system to be identify the image capture device's orientation at a designated point in time. As another example, capturing depth sensor data at the same fixed orientation at which the image data is captured may allow the image data to be directly associated with the depth sensor information.

According to various embodiments, various combinations of sensors are possible, and the system may be configured to adapt to the availability of sensor data. For instance, one mobile phone may include a first front-facing camera, a second rear-facing camera having different optical properties, a front-facing infrared depth sensor, and a rear-facing LIDAR sensor. However, a different image capture device may include different hardware elements. The system may be flexibly configured to work with a variety of devices having various configurations of IMU sensors, cameras, and depth sensors.

A determination is made at 412 as to whether to capture additional image data. As discussed with respect to operation 404, in some embodiments the system may capture image data at a specific set of predetermined orientations. Alternatively, or additionally, the system may dynamically adapt to capture more or less data based on various factors, such as light levels, capture coverage, the presence of occlusions within the space, the level of detail in the images, disruptions such as physical jarring detected based on IMU data, or other such information.

When the determination is made not to capture additional image data, then at 414 the image data is stored in association with the sensor data. According to various embodiments, data may be associated with timestamps or other association mechanisms to aid in analysis. For instance, the system may be able to determine that a particular depth map based on depth sensor information was captured at the same orientation as a particular image, and then be able to estimate the orientation based on IMU data captured prior to the capture of the depth sensor data and image data.

According to various embodiments, the operations shown in FIG. 4 may be performed in an order different than that shown. For instance, some or all of the image data may be stored immediately or almost immediately after capturing images, after operation 410 rather than after 414.

Figure 5:
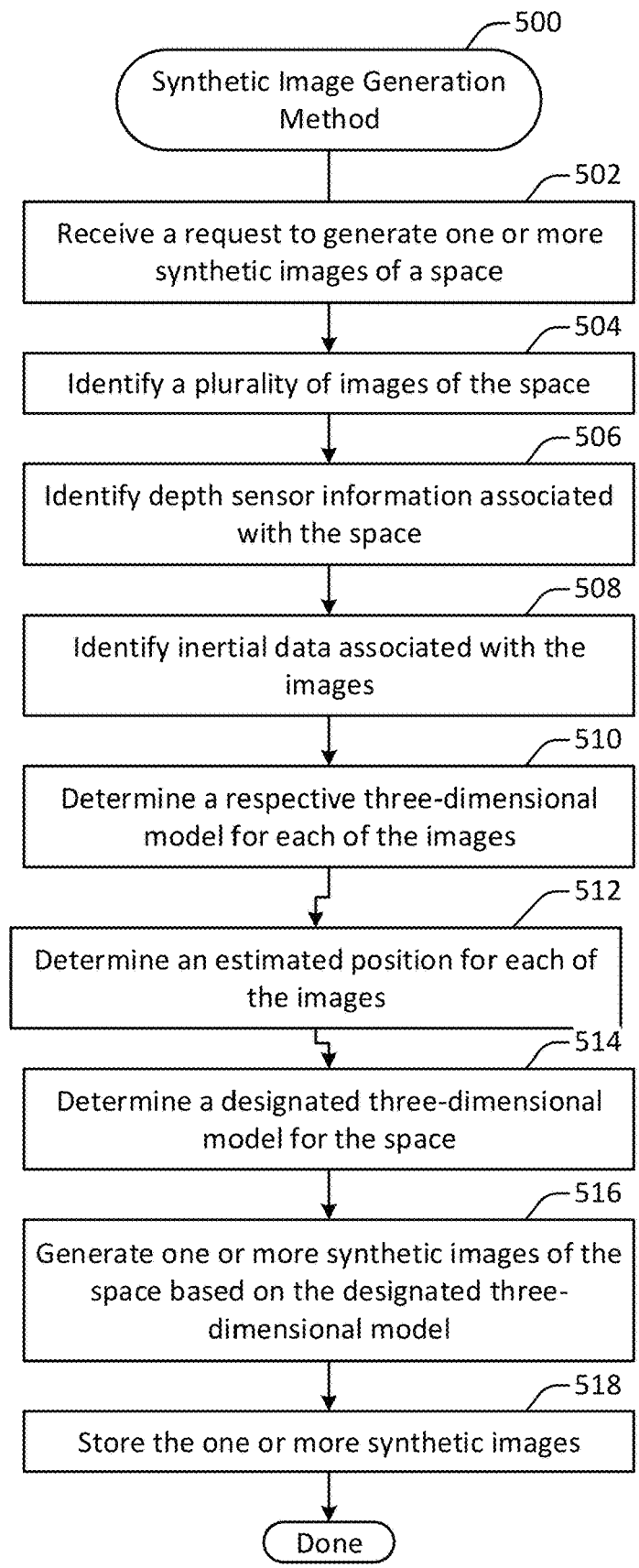
FIG. 5 illustrates one example of a method for processing image data, performed in accordance with one or more embodiments.

FIG. 5 illustrates one example of a method 500 for processing image data, performed in accordance with one or more embodiments. According to various embodiments, the method 400 may be performed on a computing device. The computing device may be an image capture device such as the device 210 mounted on an image capture gimbal device such as the device 202 shown in FIGS. 2 and 3.

A request to generate one or more synthetic images of a space is received at 502. In some implementations, the request may be generated based on user input. Alternatively, or additionally, the request may be automatically generated. For instance, after collecting a set of images of a space, the system may automatically perform the method 500 in order to apply a correction so that the images appear to be from the nodal point of the image capture gimbal device rather than from locations away from the nodal point.

A plurality of images of the space are identified at 504. According to various embodiments, the plurality of images may be captured as described with respect to the method 400 shown in FIG. 4.

Depth sensor information associated with the space is identified at 506. According to various embodiments, the depth sensor information may include one or more depth maps. Each depth map may be captured at a respective rotational position associated with the image capture gimbal device. For instance, a depth map may be captured at the same position as a respective one of the images, and different images may be associated with different corresponding depth maps.

In some implementations, each depth map may identify distance information associated with a set of points on surfaces in the space. For instance, for each of the points, the distance information may indicate a distance from the camera lens to the point. As discussed herein, depth information may be determined based on any of a variety of types of depth sensors.

In some embodiments, the depth map may provide depth information for each of the pixels in the corresponding image. Alternatively, the depth may provide depth information at a lower level of granularity, such as a single depth value for a group of pixels.

Inertial data associated with the images is identified at 508. According to various embodiments, the inertial data may include information such as accelerometer and/or gyroscopic data associated with the movement of the image capture device and/or the image capture gimbal device.

A respective three-dimensional model is determined at 510 for each of the images. In some implementations, the three-dimensional model may include a plurality of points located in a virtual three-dimensional space. The point cloud may be determined by analyzing the image data, the depth sensor data, the inertial data, and/or the estimated position.

In some implementations, the points in the three-dimensional model may be selected to reflect variation in the scene. For example, a single point may be generated from a collection of pixels that are close together and that are associated with similar depth mapping information. However, different three-dimensional points may be generated from pixels that are located further from one another in the image and that are associated with dissimilar depth mapping information.

According to various embodiments, various techniques may be used to determine the points in the three-dimensional model. For example, the location of a point in three-dimensional space may be determined by, for instance, averaging depth map information associated with points in the depth sensor data. As another example, a three-dimensional model point may be determined at least in part based on identifying key points, such as visual features, that are included in different images.

An estimated position for each of the images is determined at 512. According to various embodiments, the estimated position may be determined based at least in part on the inertial data. For instance, if the image capture device is believed to be located at a first position and then is subject to a particular set of acceleration and/or rotational forces to reach a second position, then the location and/or orientation of the second position can be estimated based on the acceleration and rotational forces.

In particular embodiments, the estimated position may be determined at least in part based on the point cloud. For instance, computation of the point cloud may be performed independently of pose estimation. The point cloud may then be positioned in the coordinate system of the image. Next, inertial information and/or other data may be used to determine a camera pose for the image.

A designated three-dimensional model for the space is determined at 514. According to various embodiments, the designated three-dimensional model may be determined by effectively combining the respective image-level three-dimensional models. Various approaches may be used to combine the three-dimensional models.

In some embodiments, the three-dimensional models may be combined by modeling the position of the camera relative to the nodal point of the image capture device gimbal. If the image capture device gimbal is arranged in a particular rotational position along its one, two, or three axes, then as a matter of geometry the position of the camera is located at a particular position in space relative to the nodal point. That position may have one or more of a translational component and a rotational component.

In some embodiments, the translational component and the rotational component may be determined via a numeric optimization procedure. For instance, the translational and rotational components may be initialized with initialization values. Then, those initialization values may be numerically optimized to identify the translational and rotational values that cause the respective three-dimensional models for each of the images to align, based on the estimated positions at which those images were captured.

In particular embodiments, translational and rotational components may be combined in various ways. For instance, as discussed with respect to FIG. 2, one or more of the rotational axes may be offset from another. In such a situation, the transformation may involve a sequence of rotational and/or translational elements. For example, the transformation may involve a first rotation along a first axis, a second rotation along a second axis, a first translation to reach the image capture device, a third rotation along a third axis, and then a second translation to reach the camera lens.

In some implementations, the translational component may be specified by a vector. For instance, the vector may be specified from the nodal point to the location of the image capture device. The vector may be specified in one, two, or three translational dimensions and one, two, or three rotational dimensions, or any other suitable parameterization.

In some implementations, the transformation may be determined again each time the image capture device is positioned in the image capture device gimbal. Alternatively, or additionally, a precise model may be numerically determined for each type of image capture device gimbal. Then, that model may be applied to reduce the number of parameters to be determined for the positioning of a particular image capture device. For instance, if the model of the gimbal is predetermined, then the only parameters that need be numerically recomputed when the image capture device is positioned may be the translation of the image capture device itself relative to the image capture device gimbal.

One or more synthetic images of the space are generated at 516 based on the designated three-dimensional model. According to various embodiments, a synthetic image may be generated by selecting a point in the virtual three-dimensional space. For instance, the point may be the nodal point, although alternatively a different point may be used. Based on the selected point and the image data may be processed to generate a new, synthetic image.

In particular embodiments, a synthetic image may be generated by applying a transformation to the pixels and/or three-dimensional model points associated with one or more of the plurality of images of the space. For instance, the rotational and translational components identified at 514 may be applied to shift the perspective of an image from its original location to the nodal point or, by altering those components accordingly, to other nearby points.

In some implementations, the one or more synthetic images may include a single panorama image of a space. Alternatively, or additionally, a set of synthetic images may be generated, for instance from a particular viewpoint.

According to various embodiments, the synthetic images may be combined to generate a multi-view interactive digital media representation (MVIDMR). The MVIDMR may be navigable in one or more dimensions. For instance, navigating the MVIDMR may involve first presenting one of the synthetic images on a display screen. Then, user input indicating a rotational motion may be received, for instance via a mouse movement, touch screen swipe, button press, or activation of another suitable affordance. Next, a second synthetic image may be presented that has a perspective that matches the rotational motion associated with the user input.

The synthetic images are stored at 518. According to various embodiments, the synthetic images may be stored on a storage medium. Alternatively, or additionally, the synthetic images may be transmitted via a communication interface for storage at a remote location.

Figure 6:
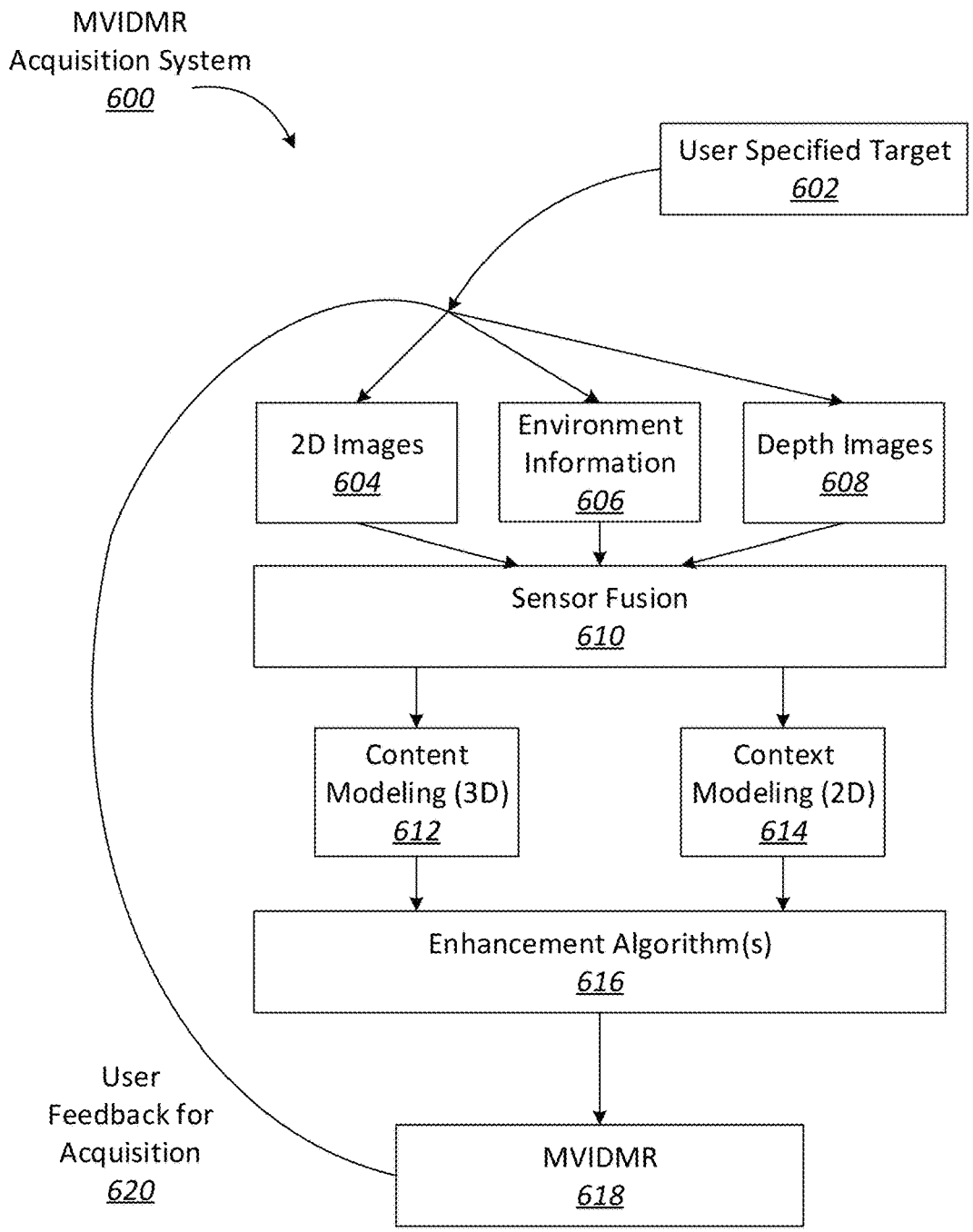
FIG. 6 illustrates an example of a MVIDMR acquisition system, configured in accordance with one or more embodiments.

FIG. 6 shows an example of a MVIDMR acquisition system 600, configured in accordance with one or more embodiments. The MVIDMR acquisition system 600 is depicted in a flow sequence that can be used to generate a MVIDMR. According to various embodiments, the data used to generate a MVIDMR can come from a variety of sources.

In particular, data such as, but not limited to two-dimensional (2D) images 604 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 606. This environment information 606 can be obtained from sources such as accelerometers, gyroscopes, magnetometers, GPS, Wi-Fi, IMU-like systems (Inertial Measurement Unit systems), and the like. Yet another source of data that can be used to generate a MVIDMR can include depth images 608. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 610. In some embodiments, a MVIDMR can be generated a combination of data that includes both 2D images 604 and environment information 606, without any depth images 608 provided. In other embodiments, depth images 608 and environment information 606 can be used together at sensor fusion block 610. Various combinations of image data can be used with environment information at 606, depending on the application and available data.

In some embodiments, the data that has been fused together at sensor fusion block 610 is then used for content modeling 612 and context modeling 614. The subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 612 and context modeling 614 can be generated by combining the image and location information data.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 602 can be chosen, as shown in FIG. 6. It should be noted, however, that a MVIDMR can be generated without a user-specified target in some applications.

In some embodiments, one or more enhancement algorithms can be applied at enhancement algorithm(s) block 616. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 616. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 618 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 618 is generated, user feedback for acquisition 620 of additional image data can be provided. In particular, if a MVIDMR is determined to need additional views to provide a more accurate model of the content or context, a user may be prompted to provide additional views. Once these additional views are received by the MVIDMR acquisition system 600, these additional views can be processed by the system 600 and incorporated into the MVIDMR.

Additional details regarding multi-view data collection, multi-view representation construction, and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

Figure 7:
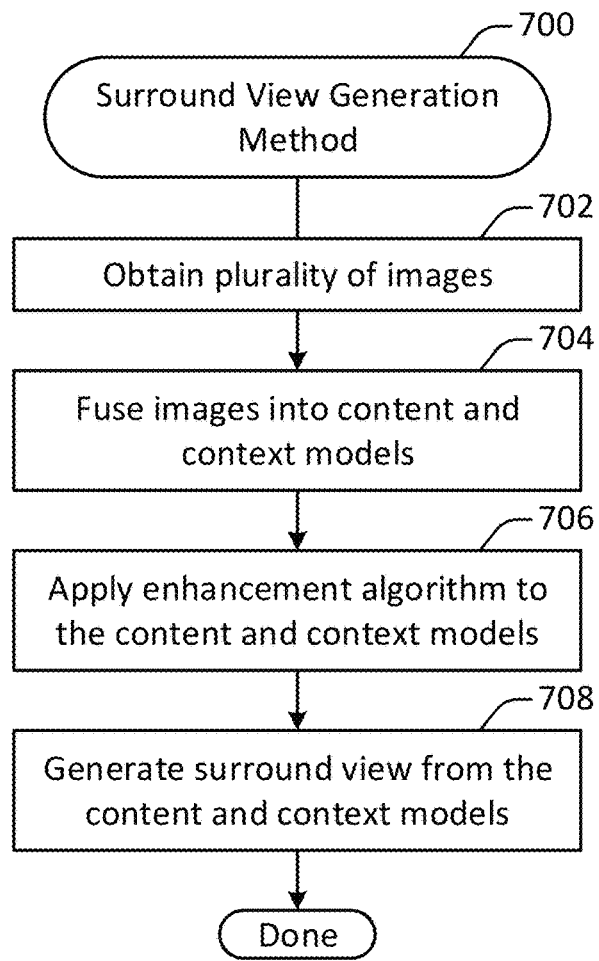
FIG. 7 illustrates one example of a method for generating a MVIDMR, performed in accordance with one or more embodiments.

FIG. 7 shows an example of a process flow diagram for generating a MVIDMR 700. In the present example, a plurality of images is obtained at 702. According to various embodiments, the plurality of images can include two-dimensional (2D) images or data streams. These 2D images can include location information that can be used to generate a MVIDMR. In some embodiments, the plurality of images can include depth images. The depth images can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 702 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 704. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 706. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 708. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

Figure 8:
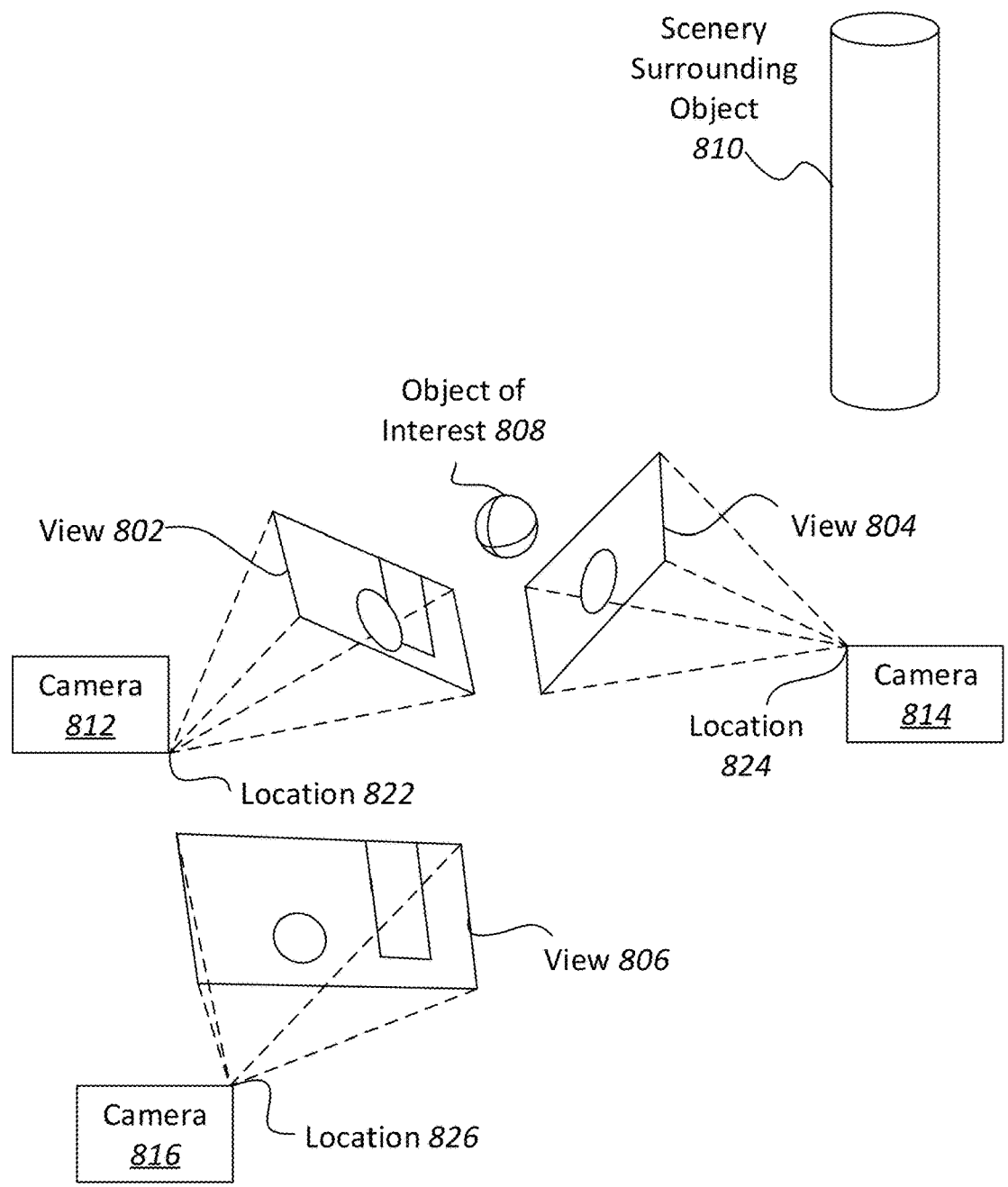
FIG. 8 illustrates one example of multiple camera views fused together into a three-dimensional (3D) model.

FIG. 8 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 812, 814, and 816 are positioned at locations 822, 824, and 826, respectively, in proximity to an object of interest 808. Scenery can surround the object of interest 808 such as object 810. Views 802, 804, and 806 from their respective cameras 812, 814, and 816 include overlapping subject matter. Specifically, each view 802, 804, and 806 includes the object of interest 808 and varying degrees of visibility of the scenery surrounding the object 810. For instance, view 802 includes a view of the object of interest 808 in front of the cylinder that is part of the scenery surrounding the object 810. View 806 shows the object of interest 808 to one side of the cylinder, and view 804 shows the object of interest without any view of the cylinder.

In some embodiments, the various views 802, 804, and 816 along with their associated locations 822, 824, and 826, respectively, provide a rich source of information about object of interest 808 and the surrounding context that can be used to produce a MVIDMR. For instance, when analyzed together, the various views 802, 804, and 826 provide information about different sides of the object of interest and the relationship between the object of interest and the scenery. According to various embodiments, this information can be used to parse out the object of interest 808 into content and the scenery as the context. Furthermore, various algorithms can be applied to images produced by these viewpoints to create an immersive, interactive experience when viewing a MVIDMR.

Figure 9:
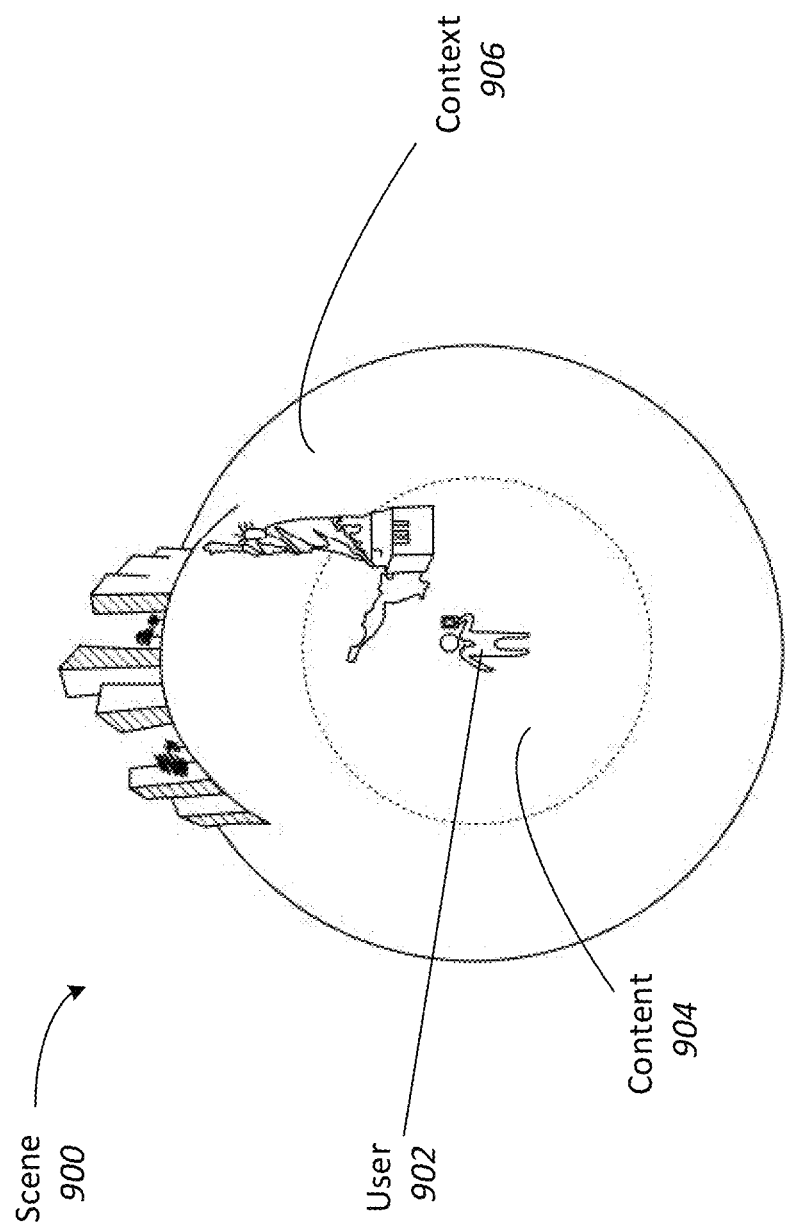
FIG. 9 illustrates one example of separation of content and context in a MVIDMR.

FIG. 9 illustrates one example of separation of content and context in a MVIDMR. According to various embodiments, a MVIDMR is a multi-view interactive digital media representation of a scene 900. With reference to FIG. 9, shown is a user 902 located in a scene 900. The user 902 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 904 and context 906. According to particular embodiments, content 904 can include the object(s), person(s), or scene(s) of interest while the context 906 represents the remaining elements of the scene surrounding the content 904. In some embodiments, a MVIDMR may represent the content 904 as three-dimensional data, and the context 906 as a two-dimensional panoramic background. In other examples, a MVIDMR may represent both the content 904 and context 906 as two-dimensional panoramic scenes. In yet other examples, content 904 and context 906 may include three-dimensional components or aspects. In particular embodiments, the way that the MVIDMR depicts content 904 and context 906 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 904 and the context 906 may be the same. In these examples, the MVIDMR produced may have some characteristics that are similar to other types of digital media such as panoramas. However, according to various embodiments, MVIDMRs include additional features that distinguish them from these existing types of digital media. For instance, a MVIDMR can represent moving data. Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

FIGS. 10A-10B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 10A, shown is one example of a concave view 1000 in which a user is standing along a vertical axis 1008. In this example, the user is holding a camera, such that camera location 1002 does not leave axis 1008 during image capture. However, as the user pivots about axis 1008, the camera captures a panoramic view of the scene around the user, forming a concave view. In this embodiment, the object of interest 1004 and the distant scenery 1006 are all viewed similarly because of the way in which the images are captured. In this example, all objects in the concave view appear at infinity, so the content is equal to the context according to this view.

With reference to FIG. 10B, shown is one example of a convex view 1020 in which a user changes position when capturing images of an object of interest 1024. In this example, the user moves around the object of interest 1024, taking pictures from different sides of the object of interest from camera locations 1028, 1030, and 1032. Each of the images obtained includes a view of the object of interest, and a background of the distant scenery 1026. In the present example, the object of interest 1024 represents the content, and the distant scenery 1026 represents the context in this convex view.

Figure 11A:
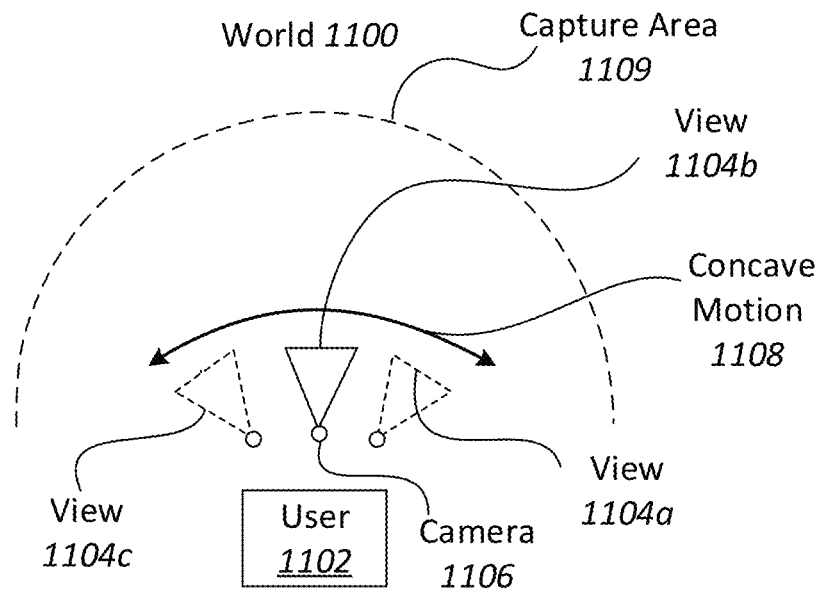
FIGS. 11A-11B illustrates one example of a back-facing, concave MVIDMR, generated in accordance with one or more embodiments.
Figure 11B:
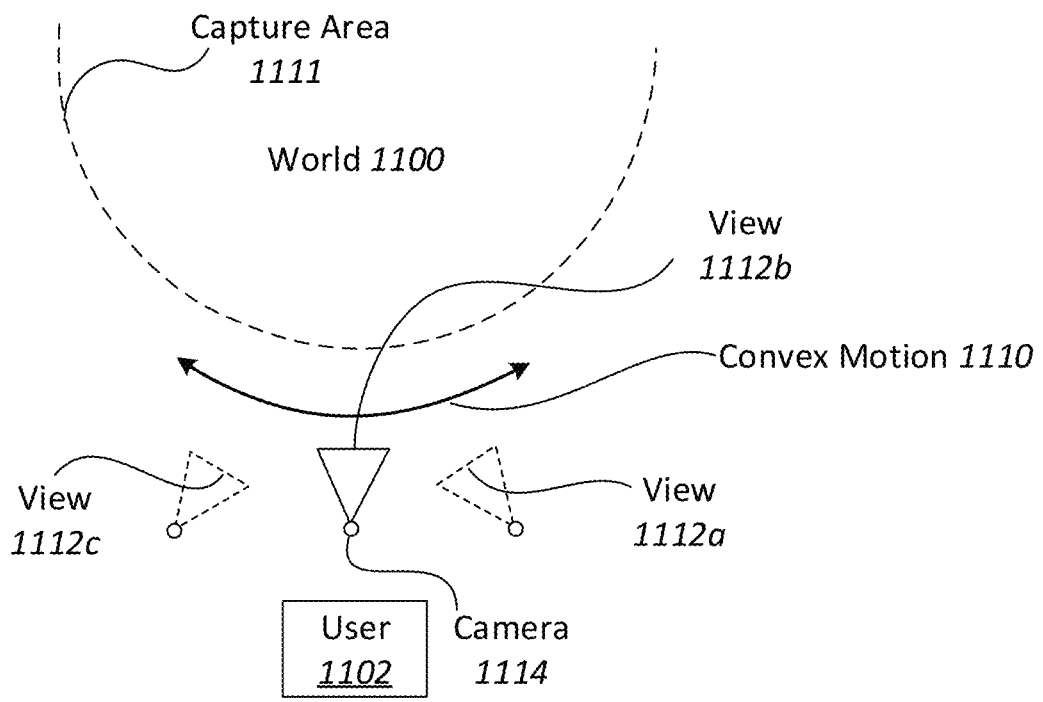

FIGS. 11A-11B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

With reference to FIG. 11A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 170 panorama (pure rotation), although the motion can be generalized to any curved sweeping motion in which the view faces outward. In the present example, the experience is that of a stationary viewer looking out at a (possibly dynamic) context.

In some embodiments, a user 1102 is using a back-facing camera 1106 to capture images towards world 1100, and away from user 1102. As described in various examples, a back-facing camera refers to a device with a camera that faces away from the user, such as the camera on the back of a smart phone. The camera is moved in a concave motion 1108, such that views 1104a, 1104b, and 1104c capture various parts of capture area 1109.

With reference to FIG. 11B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 1102 is using a back-facing camera 1114 to capture images towards world 1100, and away from user 1102. The camera is moved in a convex motion 1110, such that views 1112a, 1112b, and 1112c capture various parts of capture area 1111. As described above, world 1100 can include an object of interest in some examples, and the convex motion 1110 can orbit around this object. Views 1112a, 1112b, and 1112c can include views of different sides of this object in these examples.

Figure 12A:
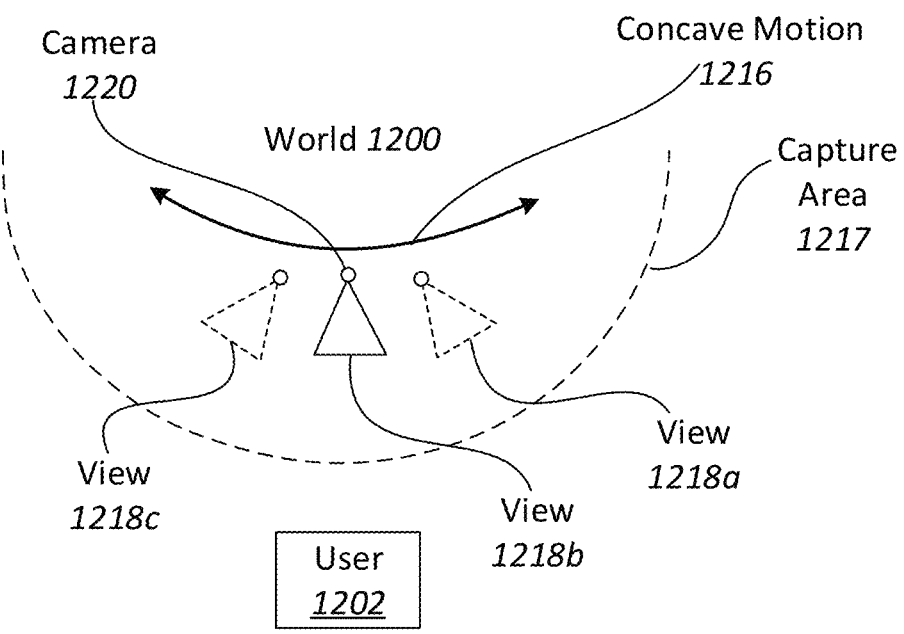
FIGS. 12A-12B illustrate examples of front-facing, concave and convex MVIDMRS generated in accordance with one or more embodiments.

With reference to FIG. 12A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 1220 is facing user 1202. The camera follows a concave motion 1206 such that the views 1218a, 1218b, and 1218c diverge from each other in an angular sense. The capture area 1217 follows a concave shape that includes the user at a perimeter.

Figure 12B:
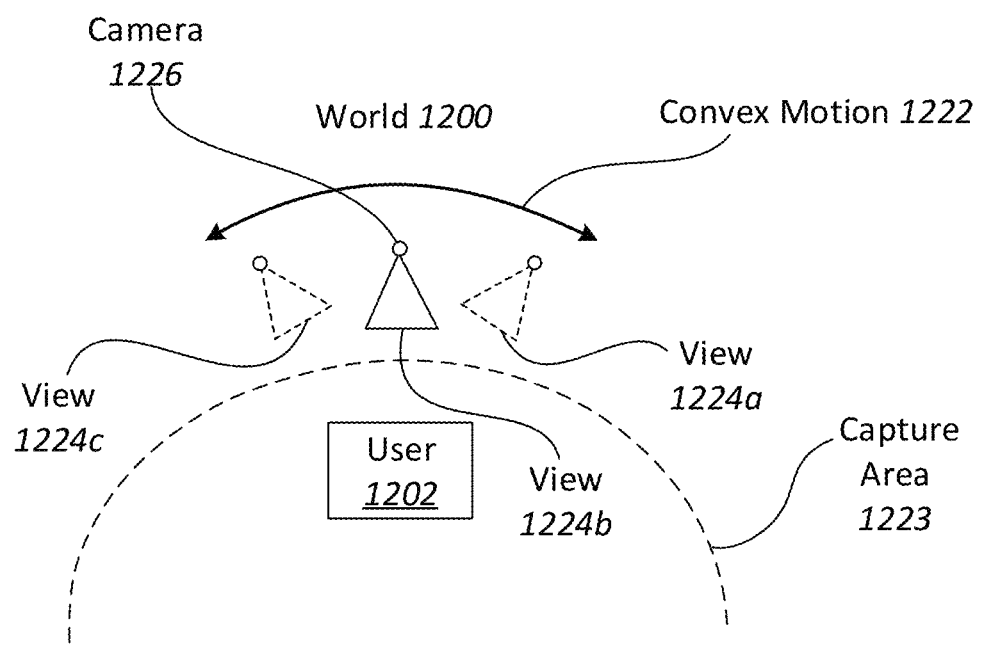

With reference to FIG. 12B, shown is an example of a front-facing, convex MVIDMR being captured. In some embodiments, camera 1226 is facing user 1202. The camera follows a convex motion 1222 such that the views 1224a, 1224b, and 1224c converge towards the user 1202. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

Figure 13:
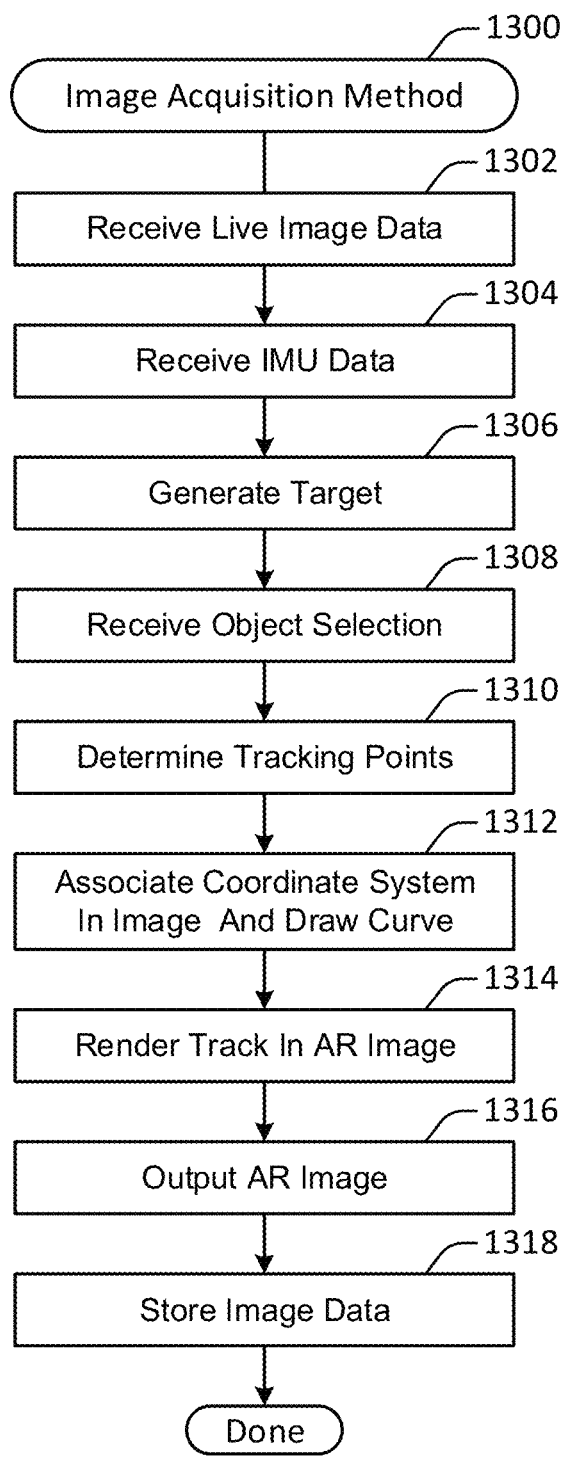
FIG. 13 illustrates one example of a method for generating virtual data associated with a target using live image data, performed in accordance with one or more embodiments.
Figure 14:
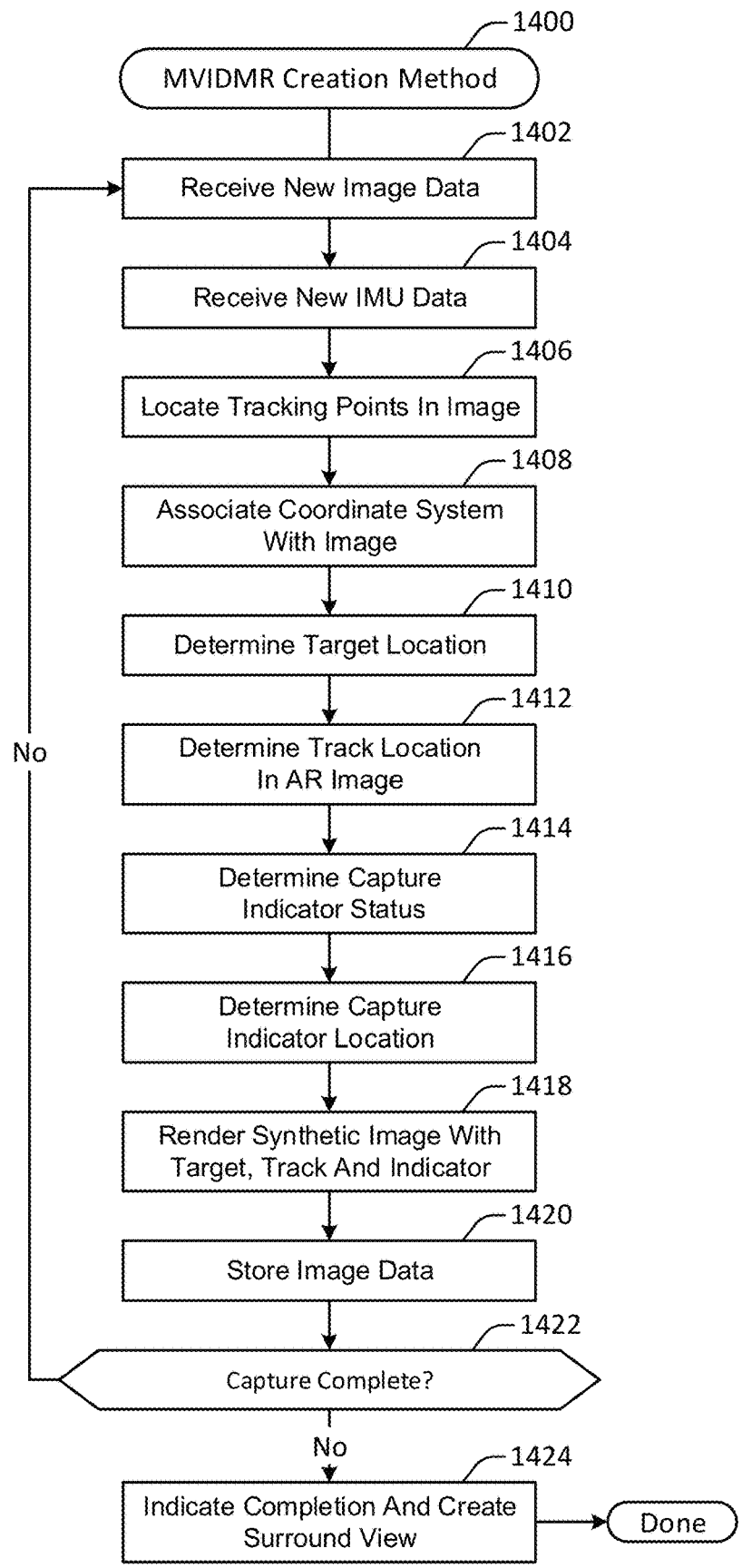
FIG. 14 illustrates one example of a method for generating MVIDMRs, performed in accordance with one or more embodiments.

FIGS. 13 and 14 illustrate an example of a process flow for capturing images in a MVIDMR using augmented reality. In 1302, live image data can be received from a camera system. For example, live image data can be received from one or more cameras on a hand-held mobile device, such as a smartphone. The image data can include pixel data captured from a camera sensor. The pixel data varies from frame to frame. In some embodiments, the pixel data can be 2-D. In other embodiments, depth data can be included with the pixel data.

In 1304, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 13, in 1306, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1308, the object selection can be received. The object selection can be used to determine an area within the image data to identify tracking points. When the area in the image data is over a target, the tracking points can be associated with an object appearing in the live image data.

In 1310, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1312, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1314, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1314, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data. The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1312.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 13, in 1316, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 12 frames per second can be output at 15 frames per second. In another embodiment, the AR images can be output at a reduced resolution, such as 60p instead of 480p. The reduced resolution can also be used to reduce computational requirements.

In 1318, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 14, the method in FIG. 13 is continued. In 1422, new image data can be received. In 1424, new IMU data (or, in general sensor data) can be received. The IMU data can represent a current orientation of the camera. In 1426, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1426, a determination may be made whether a tracking point is still visible in an image. In addition, a determination may be made as to whether a new portion of the targeted object has come into view. New tracking points can be added to the new portion to allow for continued tracking of the real object from frame to frame.

In 1428, a coordinate system can be associated with the image. For example, using an orientation of the camera determined from the sensor data, the pixel data can be calibrated to an Earth reference frame as previously described. In 1430, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1432, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1434, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1436, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1438, a synthetic image, i.e., a live image augmented with virtual objects, can be generated. The synthetic image can include the target, the track and one or more status indicators at their determined locations, respectively. In 1440, image data captured for the purposes of use in a MVIDMR can be captured. As described above, the stored image data can be raw image data without virtual objects or may include virtual objects.

In 1442, a check can be made as to whether images needed to generate a MVIDMR have been captured in accordance with the selected parameters, such as a MVIDMR spanning a desired angle range. When the capture is not complete, new image data may be received and the method may return to 1422. When the capture is complete, a virtual object can be rendered into the live image data indicating the completion of the capture process for the MVIDMR and a MVIDMR can be created. Some virtual objects associated with the capture process may cease to be rendered. For example, once the needed images have been captured the track used to help guide the camera during the capture process may no longer be generated in the live image data.

Figure 15A:
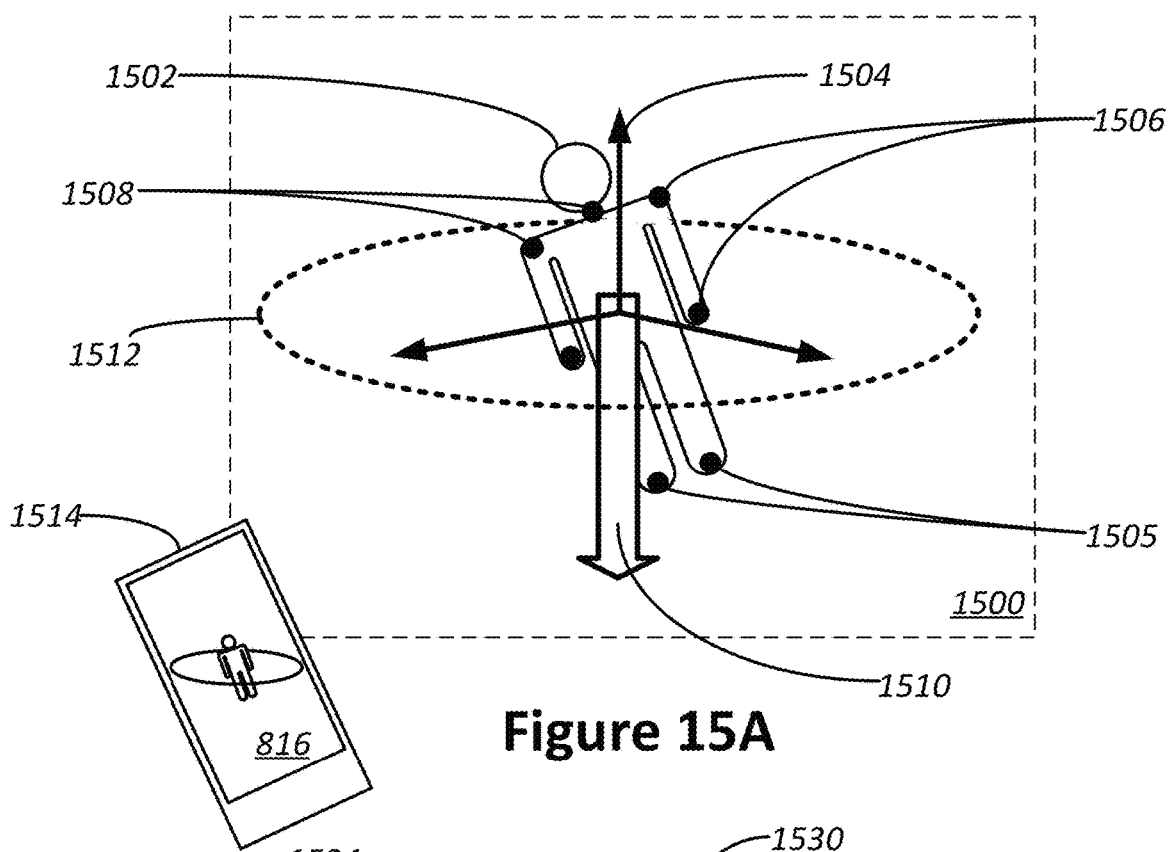
FIGS. 15A and 15B illustrate some aspects of generating an Augmented Reality (AR) image capture track for capturing images used in a MVIDMR.
Figure 15B:
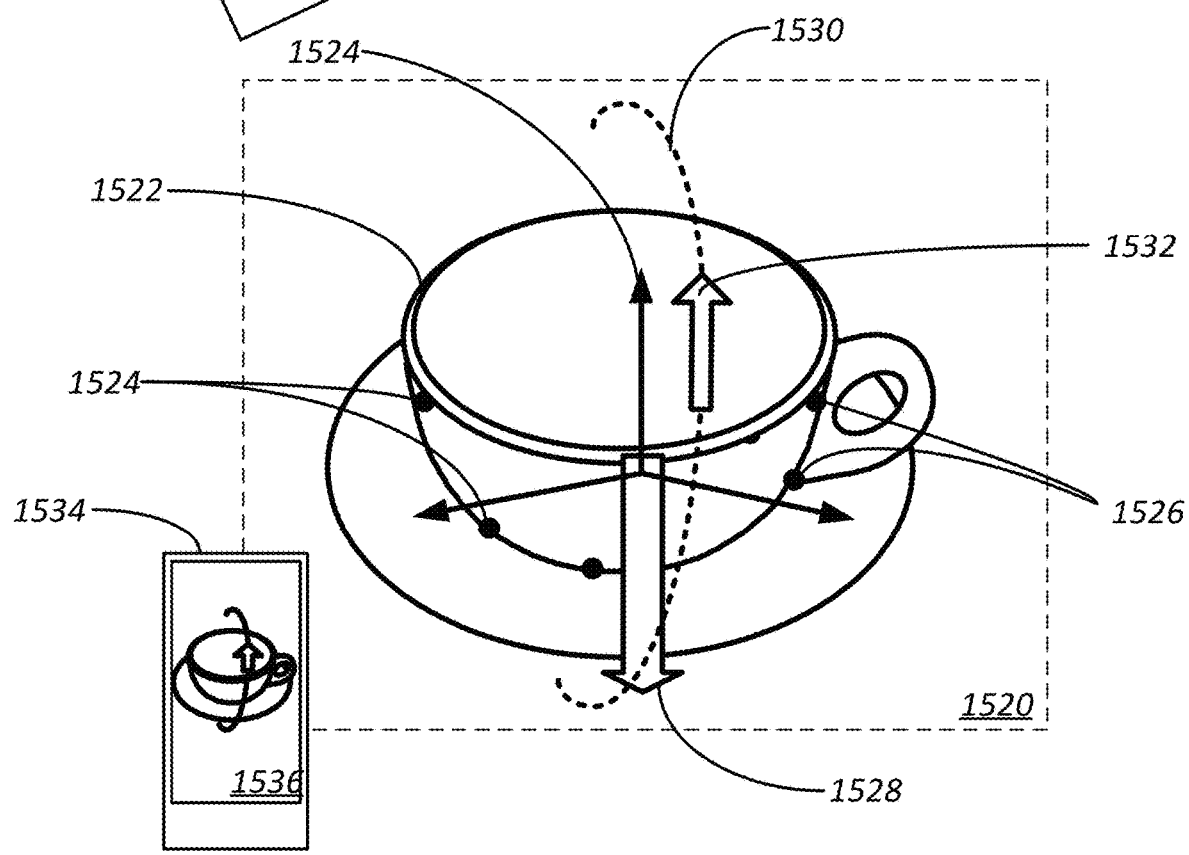

FIGS. 15A and 15B illustrate aspects of generating an Augmented Reality (AR) image capture track for capturing images used in a MVIDMR. In FIG. 15A, a mobile device 1514 with a display 1516 is shown. The mobile device can include at least one camera (not shown) with a field of view 1500. A real object 1502, which is a person, is selected in the field of view 1500 of the camera. A virtual object, which is a target (not shown), may have been used to help select the real object. For example, the target on a touch screen display of the mobile device 1514 may have been placed over the object 1502 and then selected.

The camera can include an image sensor which captures light in the field of view 1500. The data from the image sensor can be converted to pixel data. The pixel data can be modified prior to its output on display 1516 to generate a synthetic image. The modifications can include rendering virtual objects in the pixel data as part of an augmented reality (AR) system.

Using the pixel data and a selection of the object 1502, tracking points on the object can be determined. The tracking points can define the object in image space. Locations of a current set of tracking points, such as 1505, 1506 and 1508, which can be attached to the object 1502 are shown. As a position and orientation of the camera on the mobile device 1514, the shape and position of the object 1502 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1514, an Earth reference frame 3-D coordinate system 1504 can be associated with the image data. The direction of the gravity vector is indicated by arrow 1510. As described above, in a particular embodiment, the 2-D image data can be calibrated relative to the Earth reference frame. The arrow representing the gravity vector is not rendered into the live image data. However, if desired, an indicator representative of the gravity could be rendered into the synthetic image.

A plane which is perpendicular to the gravity vector can be determined. The location of the plane can be determined using the tracking points in the image, such as 1505, 1506 and 1508. Using this information, a curve, which is a circle, is drawn in the plane. The circle can be rendered into to the 2-D image data and output as part of the AR system. As is shown on display 1516, the circle appears to surround the object 1502. In some embodiments, the circle can be used as a guide for capturing images used in a MVIDMR.

If the camera on the mobile device 1514 is rotated in some way, such as tilted, the shape of the object will change on display 1516. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1502. Thus, the curve can appear to remain parallel to the ground, i.e., perpendicular to the gravity vector, as the camera 1514 moves. However, the position of the curve can move from location to location in the image as the position of the object and its apparent shape in the live images changes.

In FIG. 15B, a mobile device 1534 including a camera (not shown) and a display 1536 for outputting the image data from the camera is shown. A cup 1522 is shown in the field of view of camera 1520 of the camera. Tracking points, such as 1524 and 1526, have been associated with the object 1522. These tracking points can define the object 1522 in image space. Using the IMU data from the mobile device 1534, a reference frame has been associated with the image data. As described above, In some embodiments, the pixel data can be calibrated to the reference frame. The reference frame is indicated by the 3-D axes 1524 and the direction of the gravity vector is indicated by arrow 1528.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1530. In general, any plane can be determined in the reference frame and then a curve, which is used as a guide, can be rendered into the selected plane.

Using the locations of the tracking points, in some embodiments a centroid of the object 1522 on the selected plane in the reference can be determined. A curve 1530, such as a circle, can be rendered relative to the centroid. In this example, a circle is rendered around the object 1522 in the selected plane.

The curve 1530 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1532.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1530 is not a one to one ratio with the distance moved in physical space. In another example, a total time to traverse the path 1530 can be estimated and then the length of time during which images have been recorded can be tracked. The ratio of the recording time to the total time can be used to indicate progress along the path 1530.

The path 1530, which is an arc, and arrow 1532 are rendered into the live image data as virtual objects in accordance with their positions in the 3-D coordinate system associated with the live 2-D image data. The cup 1522, the circle 1530 and the arrow 1532 are shown output to display 1536. The orientation of the curve 1530 and the arrow 1532 shown on display 1536 relative to the cup 1522 can change if the orientation of the camera is changed, such as if the camera is tilted.

In particular embodiments, a size of the object 1522 in the image data can be changed. For example, the size of the object can be made bigger or smaller by using a digital zoom. In another example, the size of the object can be made bigger or smaller by moving the camera, such as on mobile device 1534, closer or farther away from the object 1522.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1530 and/or arrow 1532. Thus, a size of the curve relative to the object can be maintained.

In another embodiment, a size of the curve can remain fixed. For example, a diameter of the curve can be related to a pixel height or width of the image, such as 150 percent of the pixel height or width. Thus, the object 1522 can appear to grow or shrink as a zoom is used or a position of the camera is changed. However, the size of curve 1530 in the image can remain relatively fixed.

Figure 16:
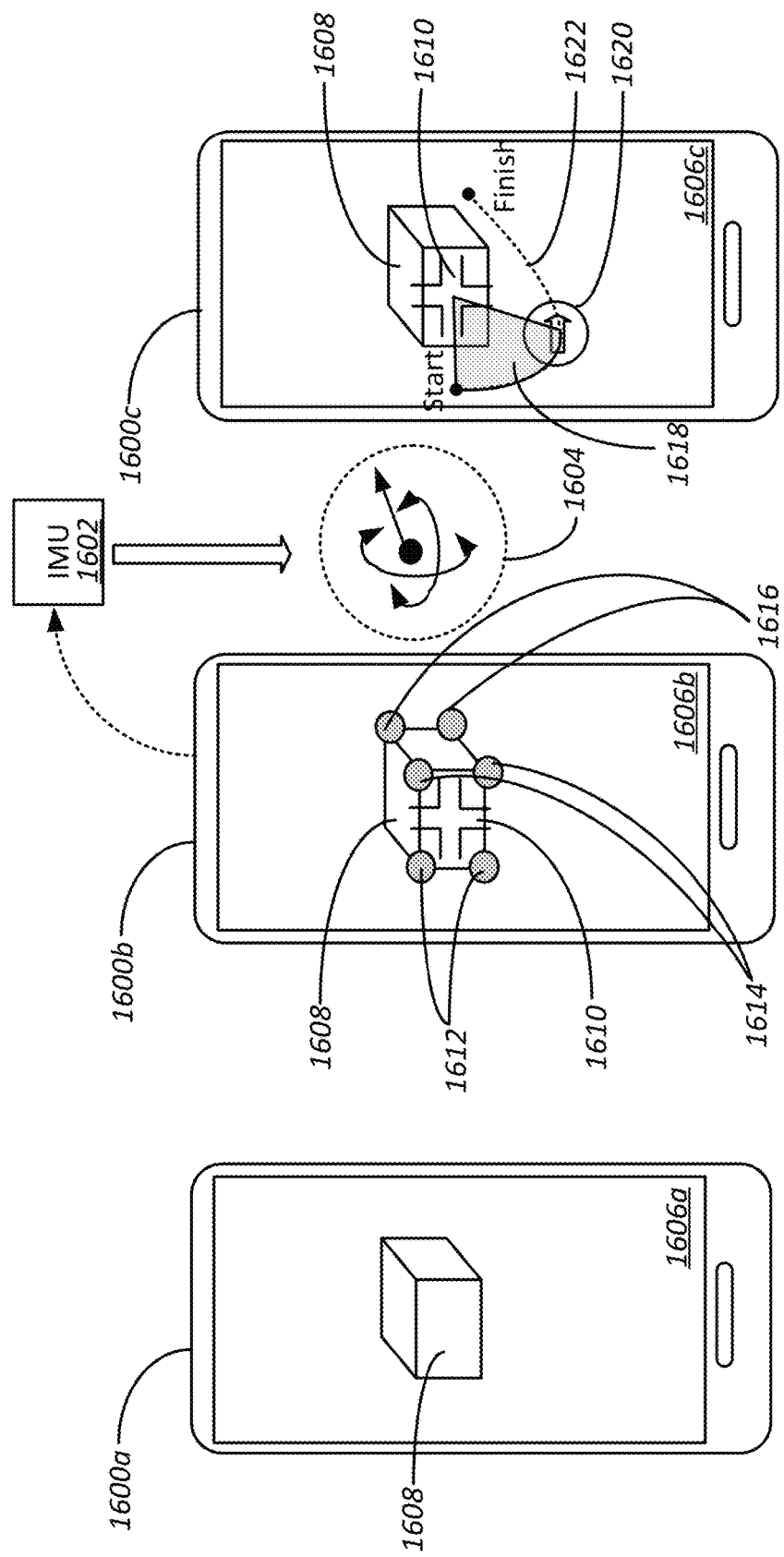
FIG. 16 illustrates one example of generating an Augmented Reality (AR) image capture track for capturing images used in a MVIDMR on a mobile device.

FIG. 16 illustrates a second example of generating an Augmented Reality (AR) image capture track for capturing images used in a MVIDMR on a mobile device. FIG. 16 includes a mobile device at three times 1600a, 1600b and 1600c. The device can include at least one camera, a display, an IMU, a processor (CPU), memory, microphone, audio output devices, communication interfaces, a power supply, graphic processor (GPU), graphical memory and combinations thereof. The display is shown with images at three times 1606a, 1606b and 1606c. The display can be overlaid with a touch screen.

In 1606a, an image of an object 1608 is output to the display in state 1606a. The object is a rectangular box. The image data output to the display can be live image data from a camera on the mobile device. The camera could also be a remote camera.

In some embodiments, a target, such as 1610, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1612, 1614 and 1616. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1604. The orientation change and current orientation of the device can be captured via the IMU data from IMU 1602 on the device.

As the orientation of the device is changed, one or more of the tracking points, such as 1612, 1614 and 1616, can be occluded. In addition, the shape of surfaces currently appearing in the image can change. Based on changes between frames, movement at various pixel locations can be determined. Using the IMU data and the determined movement at the various pixel locations, surfaces associated with the object 1608 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1606c, the live image data is augmented with a path 1622. The beginning and end of the path is indicated by the text, "start" and "finish." The distance along the path is indicated by shaded region 1618.

The circle with the arrow 1620 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

Figure 17:
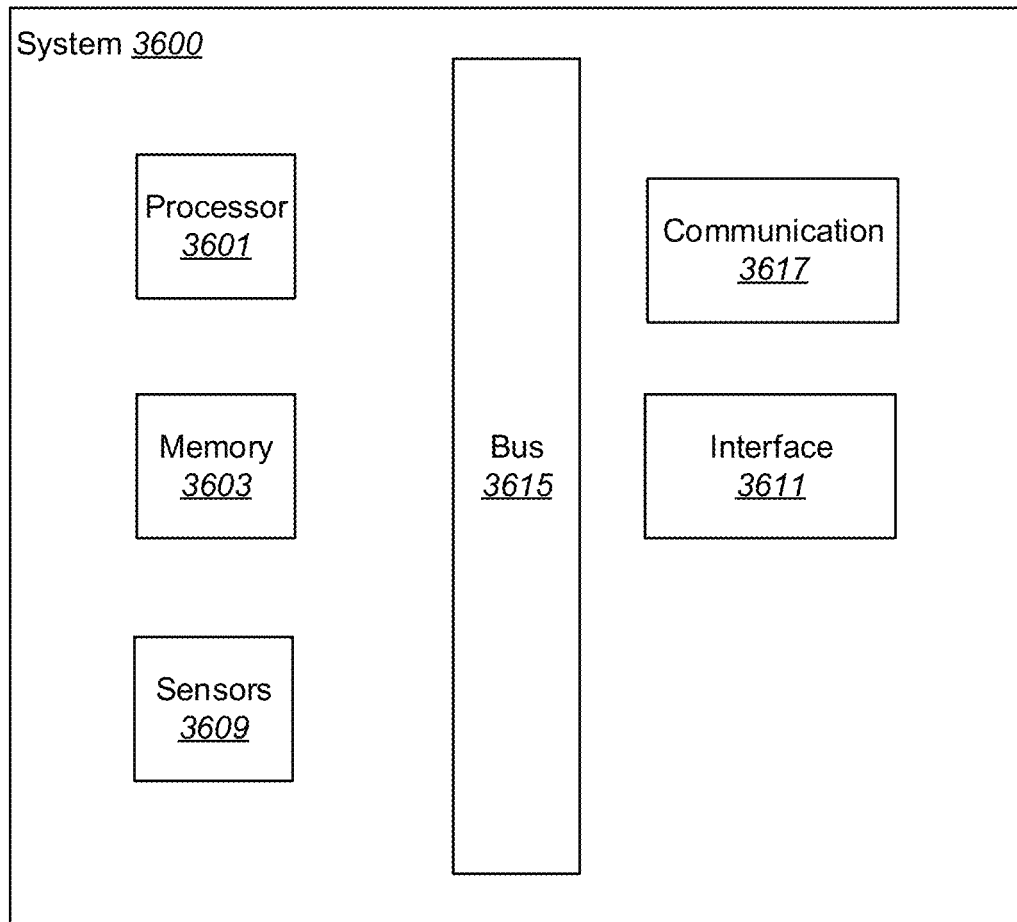
FIG. 17 illustrates a particular example of a computer system configured in accordance with various embodiments.

With reference to FIG. 17, shown is a particular example of a computer system that can be used to implement particular examples. For instance, the computer system 1700 can be used to provide MVIDMRs according to various embodiments described above. According to various embodiments, a system 1700 suitable for implementing particular embodiments includes a processor 1701, a memory 1703, an interface 1711, and a bus 1715 (e.g., a PCI bus).

The system 1700 can include one or more sensors 1709, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 6, 12, 17, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 6 bits and at frame rate of 6 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 6 fps. But, the video transformations can be performed on every other frame and synthetic images can be output at a frame rate of 12 fps. Alternatively, the transformed video data can be interpolated from the 12 fps rate to 6 fps rate by interpolating between two of the transformed video frames.

In another example, prior to performing the video transformations, the resolution of the native video data can be reduced. For example, when the native resolution is 512 by 512 pixels, it can be interpolated to a 76 by 76 pixel array using a method such as pixel averaging and then the transformation can be applied to the 76 by 76 array. The transformed video data can output and/or stored at the lower 76 by 76 resolution. Alternatively, the transformed video data, such as with a 76 by 76 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 6 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 12 milliseconds. In yet other embodiments, the latency can be less than 20 milliseconds. In yet other embodiments, the latency can be less than 10 milliseconds.

The interface 1711 may include separate input and output interfaces, or may be a unified interface supporting both operations. Examples of input and output interfaces can include displays, audio devices, cameras, touch screens, buttons and microphones. When acting under the control of appropriate software or firmware, the processor 1701 is responsible for such tasks such as optimization. Various specially configured devices can also be used in place of a processor 1701 or in addition to processor 1701, such as graphical processor units (GPUs). The complete implementation can also be done in custom hardware. The interface 1711 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1700 uses memory 1703 to store data and program instructions and maintained a local side cache. The program instructions may control the operation of an operating system and/or one or more applications, for example. The memory or memories may also be configured to store received metadata and batch requested metadata.

The system 1700 can be integrated into a single device with a common housing. For example, system 1700 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1700 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

The invention claimed is:

1. A method comprising:
identifying a plurality of images captured at an image capture device mounted on an image capture device gimbal, the image capture device gimbal capable of rotating the image capture device around a nodal point in three dimensions, each of the plurality of images being captured from a respective rotational position, the plurality of images being captured by a designated camera that is not located at the nodal point in one or more of the respective rotational positions;
generating one or more synthetic images using a designated three-dimensional model having a plurality of points in a virtual three-dimensional space, each of the synthetic images being generated from a respective virtual viewpoint within the virtual three-dimensional space, the synthetic images generated using positions of the plurality of images captured by the designated camera to correct for parallax errors caused by the images being captured at different relative positions from the nodal point in various gimbal rotational positions; and
storing the one or more synthetic images on a storage device.

2. The method of claim 1, further comprising:
determining a plurality of respective positions for the plurality of images, a designated one of the respective positions identifying a position relative to the nodal point for a designated one of the plurality of images;
determining the designated three-dimensional model using the plurality of images and the plurality of respective positions, the designated three-dimensional model including a plurality of points each having respective positions in the virtual three-dimensional space.

3. The method of claim 2, wherein determining the designated three-dimensional model comprises determining a plurality of three-dimensional models corresponding with respective ones of the plurality of images.

4. The method of claim 3, wherein the designated camera is located at a designated position relative to the nodal point, the designated position having a translation component.

5. The method of claim 4, wherein the designated three-dimensional model is determined at least in part by numerically estimating a value for the translational component using the plurality of three-dimensional models and the respective rotational positions.

6. The method of claim 5, wherein the designated position has a rotational component, and wherein the designated three-dimensional model is determined at least in part by numerically estimating a value for the rotational component using the plurality of three-dimensional models and the respective rotational positions.

7. The method of claim 2, wherein each of the respective virtual viewpoints is located at the nodal point.

8. The method of claim 2, wherein one or more of the plurality of images is associated with respective depth sensor data captured from a depth sensor located at the image capture device, and wherein the designated three-dimensional model is determined at least in part using the respective depth sensor data.

9. The method of claim 2, wherein the image capture device is configured to capture inertial data via an inertial measurement unit located at the image capture device, the method further comprising identifying one or more of the respective rotational positions based at least in part on the inertial data.

10. The method of claim 2, the method further comprising:
generating a multi-view interactive digital media representation using the synthetic images, the multi-view interactive digital media representation being navigable in one or more dimensions.

11. The method of claim 10, wherein navigating the multi-view interactive digital media representation comprises:
presenting a first one of the synthetic images on a display screen,
receiving user input indicating an adjustment to a rotational perspective, and
presenting a second one of the synthetic images on the display screen, the second synthetic image being selected to reflect the adjustment to the rotational perspective.

12. The method of claim 2, wherein identifying the plurality of images comprises transmitting one or more messages between the image capture device and the image capture device gimbal.

13. The method of claim 12, wherein a first one of the messages is transmitted from the image capture device to the image capture device gimbal, the first message indicating a first one of the respective rotational positions.

14. The method of claim 13, wherein a second one of the messages is transmitted from the image capture device gimbal to the image capture device, the second message including position data generated by the image capture device gimbal.

15. An image capture device comprising:
a designated camera configured to capture a plurality of images while the image capture device is mounted on an image capture device gimbal capable of rotating the image capture device around a nodal point in three dimensions, each of the plurality of images being captured from a respective rotational position, the designated camera not being located at the nodal point in one or more of the respective rotational positions;
a processor configured to generating one or more synthetic images using a designated three-dimensional model having a plurality of points in a virtual three-dimensional space, each of the synthetic images being generated from a respective virtual viewpoint within the virtual three-dimensional space, the synthetic images generated using positions of the plurality of images captured by the designated camera to correct for parallax errors caused by the images being captured at different relative positions from the nodal point in various gimbal rotational positions; and
a storage device configured to store the one or more synthetic images.

16. The image capture device of claim 15, wherein the processor is further configured to determine a plurality of respective positions for the plurality of images, a designated one of the respective positions identifying a position relative to the nodal point for a designated one of the plurality of images.

17. The image capture device of claim 16, wherein the processor is further configured to determine the designated three-dimensional model using the plurality of images and the plurality of respective positions, the designated three-dimensional model including a plurality of points each having respective positions in the virtual three-dimensional space.

18. The image capture device of claim 17, wherein determining the designated three-dimensional model comprises determining a plurality of three-dimensional models corresponding with respective ones of the plurality of images, and wherein the designated camera is located at a designated position relative to the nodal point, the designated position having a translation component, and wherein the designated three-dimensional model is determined at least in part by numerically estimating a value for the translational component using the plurality of three-dimensional models and the respective rotational positions.

19. A non-transitory computer readable medium comprising:
computer code for identifying a plurality of images captured at an image capture device mounted on an image capture device gimbal, the image capture device gimbal capable of rotating the image capture device around a nodal point in three dimensions, each of the plurality of images being captured from a respective rotational position, the plurality of images being captured by a designated camera that is not located at the nodal point in one or more of the respective rotational positions;
computer code for generating one or more synthetic images using a designated three-dimensional model having a plurality of points in a virtual three-dimensional space, each of the synthetic images being generated from a respective virtual viewpoint within the virtual three-dimensional space, the synthetic images generated using positions of the plurality of images captured by the designated camera to correct for parallax errors caused by the images being captured at different relative positions from the nodal point in various gimbal rotational positions; and
computer code for storing the one or more synthetic images on a storage device.

20. The non-transitory computer readable medium of claim 19, comprising:
computer code for determining a plurality of respective positions for the plurality of images, a designated one of the respective positions identifying a position relative to the nodal point for a designated one of the plurality of images;
computer code for determining the designated three-dimensional model using the plurality of images and the plurality of respective positions, the designated three-dimensional model including a plurality of points each having respective positions in the virtual three-dimensional space.

* * * * *